US011506829B2

(12) United States Patent
Chen

(10) Patent No.: US 11,506,829 B2
(45) Date of Patent: Nov. 22, 2022

(54) LIGHT-TRANSMISSIBLE ELEMENT WITH MICROSTRUCTURES AND LAMP DEVICE USING SAME

(71) Applicant: Livingstyle Enterprises Limited, Dong Guan (CN)

(72) Inventor: Ming-Yun Chen, Dong Guan (CN)

(73) Assignee: LIVINGSTYLE ENTERPRISES LIMITED, Dong Guan (CN)

( * ) Notice: Subject to any disclaimer, the term of this patent is extended or adjusted under 35 U.S.C. 154(b) by 0 days.

(21) Appl. No.: 16/641,275

(22) PCT Filed: Aug. 24, 2018

(86) PCT No.: PCT/CN2018/102349
§ 371 (c)(1),
(2) Date: Feb. 24, 2020

(87) PCT Pub. No.: WO2019/037787
PCT Pub. Date: Feb. 28, 2019

(65) Prior Publication Data
US 2020/0183076 A1 Jun. 11, 2020

(30) Foreign Application Priority Data
Aug. 24, 2017 (CN) .......................... 201721067584.X

(51) Int. Cl.
*F21V 8/00* (2006.01)
*F21V 23/04* (2006.01)
*F21Y 115/10* (2016.01)

(52) U.S. Cl.
CPC ........ *G02B 6/0036* (2013.01); *F21V 23/0471* (2013.01); *G02B 6/0065* (2013.01); *F21Y 2115/10* (2016.08)

(58) Field of Classification Search
CPC . G02B 6/0036; G02B 6/0065; F21V 23/0471; F21Y 2115/10
See application file for complete search history.

(56) References Cited

U.S. PATENT DOCUMENTS

2003/0231483 A1* 12/2003 Higashiyama ....... G02B 6/0038
362/610
2013/0322114 A1* 12/2013 Nishitani ............. G02B 6/0018
362/606

\* cited by examiner

*Primary Examiner* — Andrew J Coughlin
*Assistant Examiner* — Jessica M Apenteng
(74) *Attorney, Agent, or Firm* — WPAT, PC

(57) ABSTRACT

A light-transmissible element and a lamp device using the light-transmissible element are provided. The light-transmissible element includes a light-inputting surface, a first light-outputting surface, a second light-outputting surface and plural microstructures. The first light-outputting surface and the second light-outputting surface are located beside two opposite sides of the light-inputting surface. The plural microstructures are formed on the second light-outputting surface. The plural light beams from the light-inputting surface are received and refracted by the plural microstructures. Consequently, a luminous flux of the light beams received and refracted by each first refractive surface is higher than a luminous flux of the light beams received and refracted by each second refractive surface. Due to this design, the light extraction efficiency of the overall lamp device is increased, the light output range is adjustable and the generation of the light spots is reduced.

16 Claims, 16 Drawing Sheets

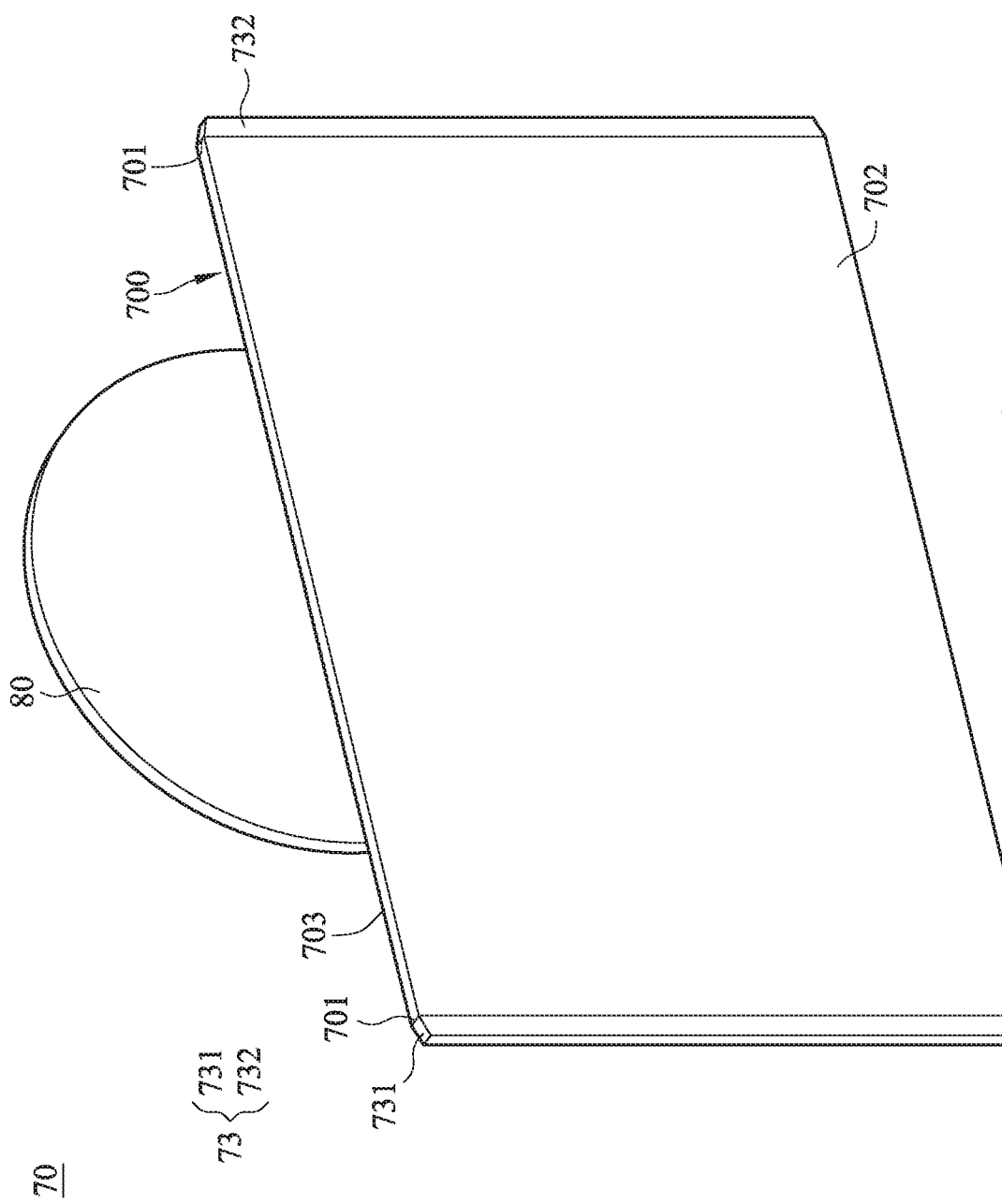

LIGHT-TRANSMISSIBLE ELEMENT WITH MICROSTRUCTURES AND LAMP DEVICE USING SAME

FIELD OF THE INVENTION

The present invention relates to a lamp device, and more particularly to a light-transmissible element with microstructures and a lamp device using the light-transmissible element.

BACKGROUND OF THE INVENTION

A conventional lamp device comprises a lamp body with a lampshade. The lampshade is a light guide element that is not light-transmissible. The lampshade is used to decorate and shield light. In addition, at least one light-emitting element in the lamp body emits plural light beams. The plural light beams are emitted along a lighting direction through the lampshade.

However, the applications of the conventional lampshade still have some problems. For example, since the conventional lampshade is used for shielding the light source, the conventional lampshade does not have opacity. Consequently, the building material decoration or the backboard decoration (e.g., the art installation or the art exhibition) behind the lampshade is shielded. Since the conventional lampshade does not have the visual penetration property, the visual effect and the openness in the overall space are adversely affected.

As mentioned above, the visual effect and the openness of the conventional lamp device are usually deficient. For pursuing better lighting effects in the lamp device, some additional problems need to be overcome. For example, it is necessary to increase the luminous flux of the overall lamp device (i.e., equivalent to the light extraction efficiency of the lampshade) and increase the light output range of the lamp device. For solving the above problems, the conventional lamp device with the lampshade uses the high-power light-emitting element (e.g., LED) or comprises more light-emitting elements.

However, the use of the high-power light-emitting element or so many light-emitting elements increases the installation cost of the overall lamp device and generates a great deal of heat. Moreover, the refraction of the light beam may readily generate light spots. Moreover, in case that the lamp device comprises the high-power light-emitting element or so many light-emitting elements, the lamp device consumes more electric power and the operating cost of the lamp device increases.

For solving the drawbacks of the conventional technologies, it is important to provide the visual effect and the openness to the lampshade of the lamp device while increasing the overall lighting efficacy.

SUMMARY OF THE INVENTION

For solving the drawbacks of the conventional technologies, the present invention provides a light-transmissible element with microstructures and a lamp device using the light-transmissible element. Due to the structural design, the light extraction efficiency of the overall lamp device is increased, the light output range is adjustable, and the generation of the light spots is reduced.

In accordance with an aspect of the present invention, a light-transmissible element with plural microstructures is provided for receiving plural light beams. The light-transmissible element at least includes a first light-outputting surface, a second light-outputting surface and the plural microstructures. The second light-outputting surface is opposed to the first light-outputting surface. The plural microstructures are formed on the second light-outputting surface. Each microstructure at least includes a first refractive surface and a second refractive surface. A travelling direction of the plural light beams and the plural microstructures are in a vertical interference relationship or a non-parallel interference relationship. A luminous flux of the light beams received and refracted by each first refractive surface is higher than a luminous flux of the light beams received and refracted by each second refractive surface.

In an embodiment, the plural microstructures are completely or partially vertical to the light beams to receive and refract the light beams according to the vertical interference relationship, and the plural microstructures are completely or partially non-parallel to the light beams to receive and refract the light beams according to the vertical interference relationship.

In an embodiment, the plural microstructures are V-shaped optical refractive structures, U-shaped optical refractive structures, curvy optical refractive structures, or the combination thereof.

In an embodiment, a spacing interval between two adjacent microstructures of the plural microstructures is different from a spacing interval between other two adjacent microstructures of the plural microstructures.

In an embodiment, a spacing interval between every two adjacent microstructures of the plural microstructures is gradually decreased or increased along a direction away from a light source of the plural light beams.

In an embodiment, a depth of each microstructure relative to the second light-outputting surface is gradually decreased or increased along a direction away from a light source of the plural light beams.

In each microstructure, an acute angle between the first refractive surface and the second light-outputting surface is smaller than an acute angle between the second refractive surface and the second light-outputting surface.

In an embodiment, adjacent microstructures of the plural microstructures are in a continuous arrangement, a discontinuous arrangement or a partially-continuous arrangement.

If the light beams are not received by the light-transmissible element, the light-transmissible element is in a visual penetration state. Whereas, if the light beams are received and refracted by the light-transmissible element, the light-transmissible element is in an illumination state.

When the light-transmissible element is in the visual penetration state, at least one article located at the second light-outputting surface is visible through the first light-outputting surface. When the light-transmissible element is in the illumination state, a luminous flux of the light beams outputted from the first light-outputting surface is higher than a luminous flux of the light beams outputted from the second light-outputting surface.

In an embodiment, the light-transmissible element is made of polycarbonate, acrylonitrile-butadiene-styrene, or a combination thereof.

In an embodiment, the light-transmissible element is a circular light-transmissible element, a rectangular light-transmissible element, a polygonal light-transmissible element or an irregular light-transmissible element.

In an embodiment, the light-transmissible element is installed in a lamp device, a lighting device, a door/window panel or an exhibition frame.

In accordance with another aspect of the present invention, a light-transmissible element with plural microstructures is provided for receiving plural light beams. The light-transmissible element at least includes a first light-outputting surface, a second light-outputting surface and the plural microstructures. The second light-outputting surface is opposed to the first light-outputting surface. An optical channel is arranged between the first light-outputting surface and the second light-outputting surface. The plural microstructures are formed on the second light-outputting surface. If the light beams are not received by the light-transmissible element, the light-transmissible element is in a visual penetration state. If the light beams are received and refracted by the light-transmissible element, the light-transmissible element is in an illumination state, and a luminous flux of the light beams outputted from the first light-outputting surface is higher than a luminous flux of the light beams outputted from the second light-outputting surface.

When the light-transmissible element is in the visual penetration state, at least one article located at the second light-outputting surface is visible through the first light-outputting surface. When the light-transmissible element is in the illumination state, the light beams are received and refracted by the plural microstructures, so that the luminous flux of the light beams outputted from the first light-outputting surface is higher than the luminous flux of the light beams outputted from the second light-outputting surface.

In an embodiment, the light-transmissible element has a sealed, solid and thin light-transmissible structure, or the light-transmissible element has a hollow light-transmissible structure with a first light-transmissible plate and a second light-transmissible plate. The first light-outputting surface is formed on the first light-transmissible plate. The second light-outputting surface is formed on the second light-transmissible plate. The second light-outputting surface of the hollow light-transmissible structure includes an inner side and an outer side. The inner side of the second light-outputting surface is closer to the first light-outputting surface than the outer side of the second light-outputting surface. The plural microstructures are formed on at least one of the outer side of the second light-outputting surface.

When the light-transmissible element has the hollow light-transmissible structure, the optical channel is a hollow gap between the inner side of the second light-outputting surface and the first light-outputting surface, and the plural light beams are transferred through the hollow gap.

In an embodiment, the optical channel is a gap between the inner side of the second light-outputting surface and the first light-outputting surface, and the plural light beams are transferred through the gap.

In an embodiment, a spacing interval between two adjacent microstructures of the plural microstructures is different from a spacing interval between other two adjacent microstructures of the plural microstructures; or a spacing interval between every two adjacent microstructures of the plural microstructures is gradually decreased or increased along a direction away from a light source of the plural light beams; or a depth of each microstructure relative to the second light-outputting surface is gradually decreased or increased along a direction away from a light source of the plural light beams.

In an embodiment, each microstructure includes a first refractive surface and a second refractive surface. An acute angle between the first refractive surface and the second light-outputting surface is smaller than an acute angle between the second refractive surface and the second light-outputting surface.

In an embodiment, after the plural light beams are received and refracted by the plural microstructures, portions of the plural light beams are uniformly distributed on the second light-outputting surface and uniformly outputted to surroundings.

In accordance with another aspect of the present invention, a light-transmissible element with plural microstructures is provided for receiving plural light beams from at least one light-emitting element of a lamp device. The light-transmissible element at least includes a light-inputting surface, a first light-outputting surface, a second light-outputting surface and the plural microstructures. The light-inputting surface receives the plural light beams. The first light-outputting surface is located beside a first side of the light-inputting surface. The second light-outputting surface is located beside a second side of the light-inputting surface, and opposed to the first light-outputting surface. The plural microstructures are formed on the second light-outputting surface. After the plural light beams are received and refracted by the plural microstructures, the light beams are outputted from the first light-outputting surface and the second light-outputting surface. A luminous flux of the light beams outputted from the first light-outputting surface is higher than a luminous flux of the light beams outputted from the second light-outputting surface.

In an embodiment, the light-inputting surface and the second light-outputting surface are vertical to each other such that the plural light beams are received and refracted by the plural microstructures in a vertical manner, or the light-inputting surface and the second light-outputting surface are non-parallel to each other such that the plural light beams are received and refracted by the plural microstructures in a non-parallel manner. Alternatively, a travelling direction of the plural light beams and the plural microstructures are in a vertical interference relationship or a non-parallel interference relationship.

In an embodiment, a spacing interval between every two adjacent microstructures of the plural microstructures is gradually decreased or increased along a direction away from a light source of the plural light beams; or a depth of each microstructure relative to the second light-outputting surface is gradually decreased or increased along a direction away from a light source of the plural light beams; or each microstructure includes a first refractive surface and a second refractive surface and an acute angle between the first refractive surface and the second light-outputting surface is smaller than an acute angle between the second refractive surface and the second light-outputting surface.

In accordance with another aspect of the present invention, a light-transmissible element with plural microstructures is provided for receiving plural light beams from at least one light-emitting element of a lamp device. The light-transmissible element at least includes a light-inputting surface, a first light-outputting surface and a second light-outputting surface. The light-inputting surface receives the plural light beams. The second light-outputting surface has the plural microstructures. The second light-outputting surface is opposed to the first light-outputting surface and separated from the first light-outputting surface by a gap. The second light-outputting surface and the light-inputting surface are in a vertical relationship or a non-parallel relationship. Through the plural microstructures, a luminous flux of the light beams outputted from the first light-outputting surface is higher than the luminous flux of the light beams outputted from the second light-outputting surface.

When the second light-outputting surface and the light-inputting surface are in the vertical relationship, the second light-outputting surface is vertically located beside the light-inputting surface. When the second light-outputting surface and the light-inputting surface are in the non-parallel relationship, the second light-outputting surface is located beside the light-inputting surface and the second light-outputting surface is not vertical to the light-inputting surface.

In an embodiment, a spacing interval between every two adjacent microstructures of the plural microstructures is gradually decreased or increased along a direction away from a light source of the plural light beams.

In an embodiment, the second light-outputting surface includes an inner side and an outer side. The inner side of the second light-outputting surface is closer to the first light-outputting surface than the outer side of the second light-outputting surface. The plural microstructures are formed on the outer side of the second light-outputting surface. The gap is arranged between the inner side of the second light-outputting surface and the first light-outputting surface, and the plural light beams are transferred through the gap.

In accordance with another aspect of the present invention, a lamp device with a light-transmissible element is provided. The lamp device at least includes a lamp body, at least one light-emitting element and the light-transmissible element. The at least one light-emitting element is installed on the lamp bod. The at least one light-emitting element emits plural light beams under control of a control circuit board. The light-transmissible element is combined with the lamp body. The light-transmissible element includes a light-inputting surface, a first light-outputting surface, a second light-outputting surface and plural microstructures. The light-inputting surface receives the plural light beams. The first light-outputting surface is located beside a first side of the light-inputting surface. The second light-outputting surface is located beside a second side of the light-inputting surface, and opposed to the first light-outputting surface. The plural microstructures are formed on the second light-outputting surface. A first microstructure of the plural microstructures is different from a second microstructure of the plural microstructures. After the plural light beams are received and refracted by the plural microstructures, the light beams are outputted from the first light-outputting surface and the second light-outputting surface. A luminous flux of the light beams outputted from the first light-outputting surface is higher than a luminous flux of the light beams outputted from the second light-outputting surface.

In an embodiment, the plural microstructures are V-shaped optical refractive structures, U-shaped optical refractive structures, curvy optical refractive structures, or the combination thereof.

In an embodiment, a spacing interval between every two adjacent microstructures of the plural microstructures is gradually decreased or increased along a direction away from the at least one light-emitting element.

In an embodiment, a depth of each microstructure relative to the second light-outputting surface is gradually decreased or increased along a direction away from the at least one light-emitting element.

In an embodiment, each microstructure includes a first refractive surface and a second refractive surface. An acute angle between the first refractive surface and the second light-outputting surface is smaller than an acute angle between the second refractive surface and the second light-outputting surface.

In an embodiment, adjacent microstructures of the plural microstructures are in a continuous arrangement, a discontinuous arrangement or a partially-continuous arrangement.

In an embodiment, the lamp body includes a coupling mechanism with a guiding slot. The light-transmissible element is assembled and connected with the at least one light-emitting element through the guiding slot.

In an embodiment, the coupling mechanism further includes plural fins, and the plural fins and the second light-outputting surface are located at the same side.

In an embodiment, the lamp device further includes at least one of a passive infrared motion sensor and a microwave sensor, which is electrically connected with the control circuit board. If an object is sensed by the passive infrared motion sensor or the microwave sensor, the control circuit board is driven to control the at least one light-emitting element to emit the plural light beams.

In accordance with another aspect of the present invention, a light-transmissible element with plural microstructures is provided for receiving plural light beams. The light-transmissible element at least includes a first light-outputting surface, a second light-outputting surface and the plural microstructures. The second light-outputting surface is opposed to the first light-outputting surface. The plural microstructures are formed on the second light-outputting surface. Each microstructure at least includes a first refractive surface and a second refractive surface. A travelling direction of the plural light beams and the plural microstructures are in a vertical interference relationship or a non-parallel interference relationship, so that the plural light beams are outputted from the first light-outputting surface and the second light-outputting surface.

In accordance with another aspect of the present invention, a light-transmissible element with plural microstructures is provided for receiving plural light beams from at least one light-emitting element of a lamp device. The light-transmissible element at least includes a first light-outputting surface, a second light-outputting surface and the plural microstructures. The second light-outputting surface is opposed to the first light-outputting surface. An optical channel is arranged between the first light-outputting surface and the second light-outputting surface. The plural microstructures are formed on the second light-outputting surface. If the light beams are not received by the light-transmissible element, the light-transmissible element is in a visual penetration state. If the light beams are received and refracted by the plural microstructures through the first light-outputting surface and the second light-outputting surface, the light-transmissible element is in an illumination state.

In accordance with another aspect of the present invention, a light-transmissible element with plural microstructures is provided for receiving plural light beams from at least one light-emitting element of a lamp device. The light-transmissible element at least includes a light-inputting surface, a first light-outputting surface and a second light-outputting surface. The light-inputting surface receives the plural light beams. The second light-outputting surface has the plural microstructures. The second light-outputting surface is opposed to the first light-outputting surface and separated from the first light-outputting surface by a gap. The second light-outputting surface and the light-inputting surface are in a vertical relationship or a non-parallel relationship.

In accordance with another aspect of the present invention, a lamp device with a light-transmissible element is provided. The lamp device at least includes a lamp body, at least one light-emitting element and the light-transmissible element. The at least one light-emitting element is installed on the lamp body. The at least one light-emitting element emits plural light beams under control of a control circuit board. The light-transmissible element is combined with the lamp body. The light-transmissible element includes a light-inputting surface, a first light-outputting surface, a second light-outputting surface and plural microstructures. The light-inputting surface receives the plural light beams. The first light-outputting surface is located beside a first side of the light-inputting surface. The second light-outputting surface is located beside a second side of the light-inputting surface, and opposed to the first light-outputting surface. The plural microstructures are formed on the second light-outputting surface. A first microstructure of the plural microstructures is different from a second microstructure of the plural microstructures. After the plural light beams are received and refracted by the plural microstructures, the light beams are outputted from the first light-outputting surface and the second light-outputting surface.

From the above descriptions, the present invention provides a light-transmissible element and a lamp device with the light-transmissible element. In accordance with the features of the present invention, the appearance of the light-transmissible element and the profiles and the arrangements of the microstructures are specially designed. Consequently, the lighting effect and the usage state of the light-transmissible element can be adjusted according to the practical requirements. Due to this design, the light extraction efficiency of the overall lamp device is increased, the light output range is adjustable and the generation of the light spots is reduced. Moreover, the usage state of the light-transmissible element may be selectively in a visual penetration state or an illumination state according to the practical requirements. Consequently, the multiple effects are provided.

BRIEF DESCRIPTION OF THE DRAWINGS

FIG. 7B schematically illustrates the usage statuses of the light-transmissible element as shown in FIG. 7A.

DETAILED DESCRIPTION OF THE PREFERRED EMBODIMENT

The embodiments of present invention will be described more specifically with reference to the following drawings. In the following embodiments and drawings, the elements irrelevant to the concepts of the present invention or the elements well known to those skilled in the art are omitted. It is noted that numerous modifications and alterations may be made while retaining the teachings of the invention.

Figure 1A:
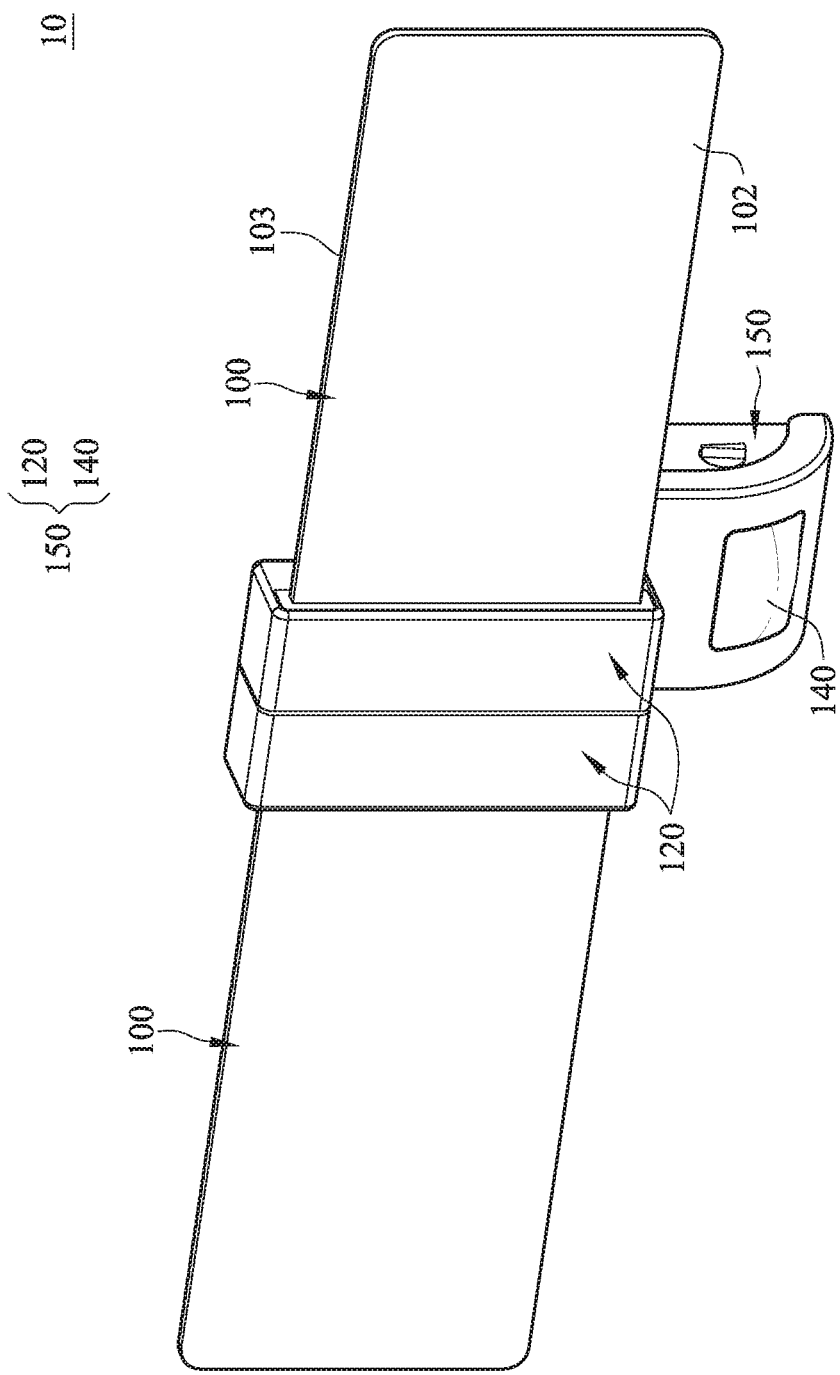
FIG. 1A is a schematic perspective view illustrating a lamp device according to a first embodiment of the present invention.
Figure 1B:
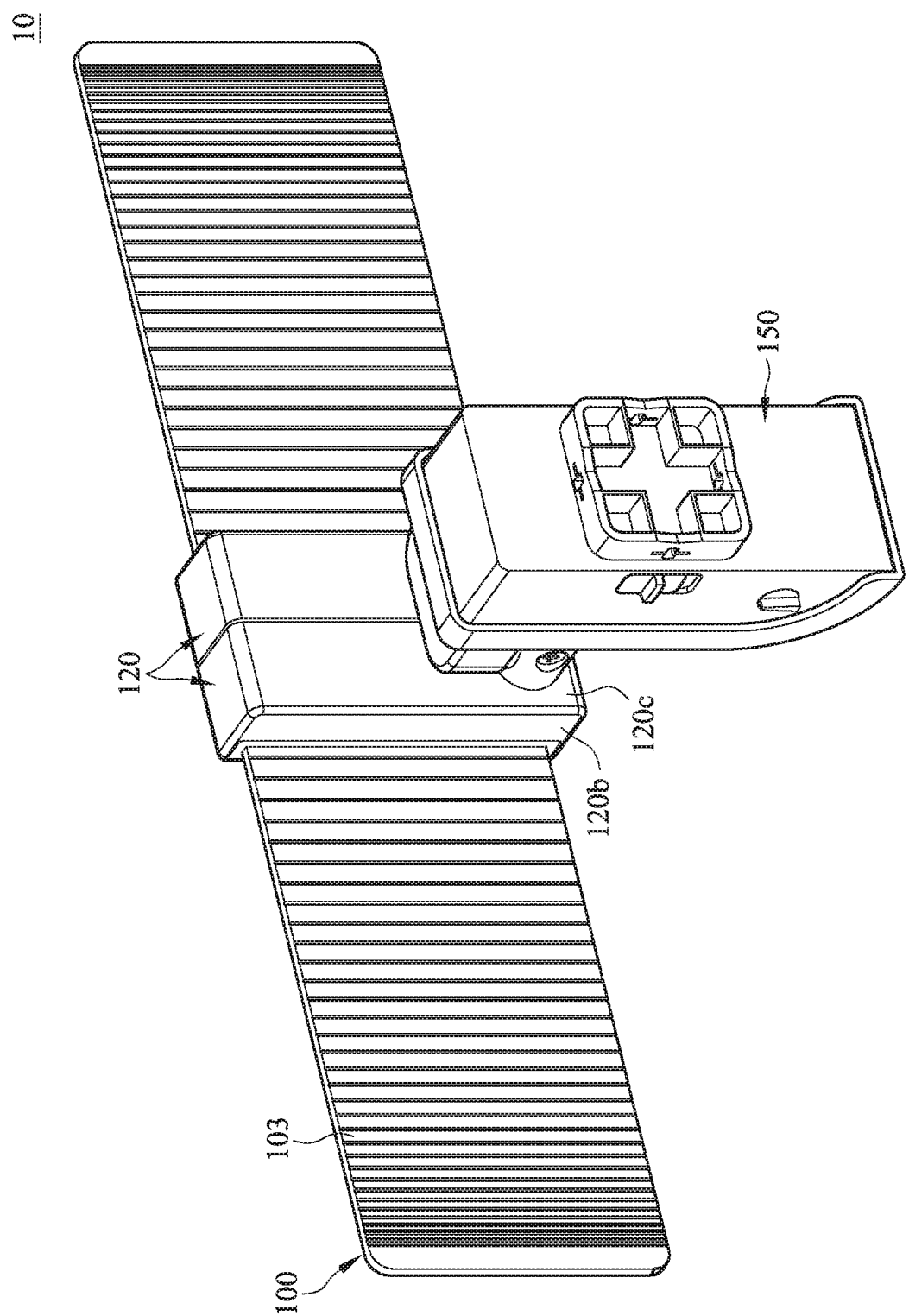
FIG. 1B is a schematic perspective view illustrating the lamp device as shown in FIG. 1A and taken along another viewpoint.

FIGS. 1A to 1E schematically illustrate the perspective view and the exploded views of some components of a light-transmissible element according to a first embodiment of the present invention, and illustrates the partially enlarged view of the microstructure in the light-transmissible element as shown in FIG. 1A.

Figure 1C:
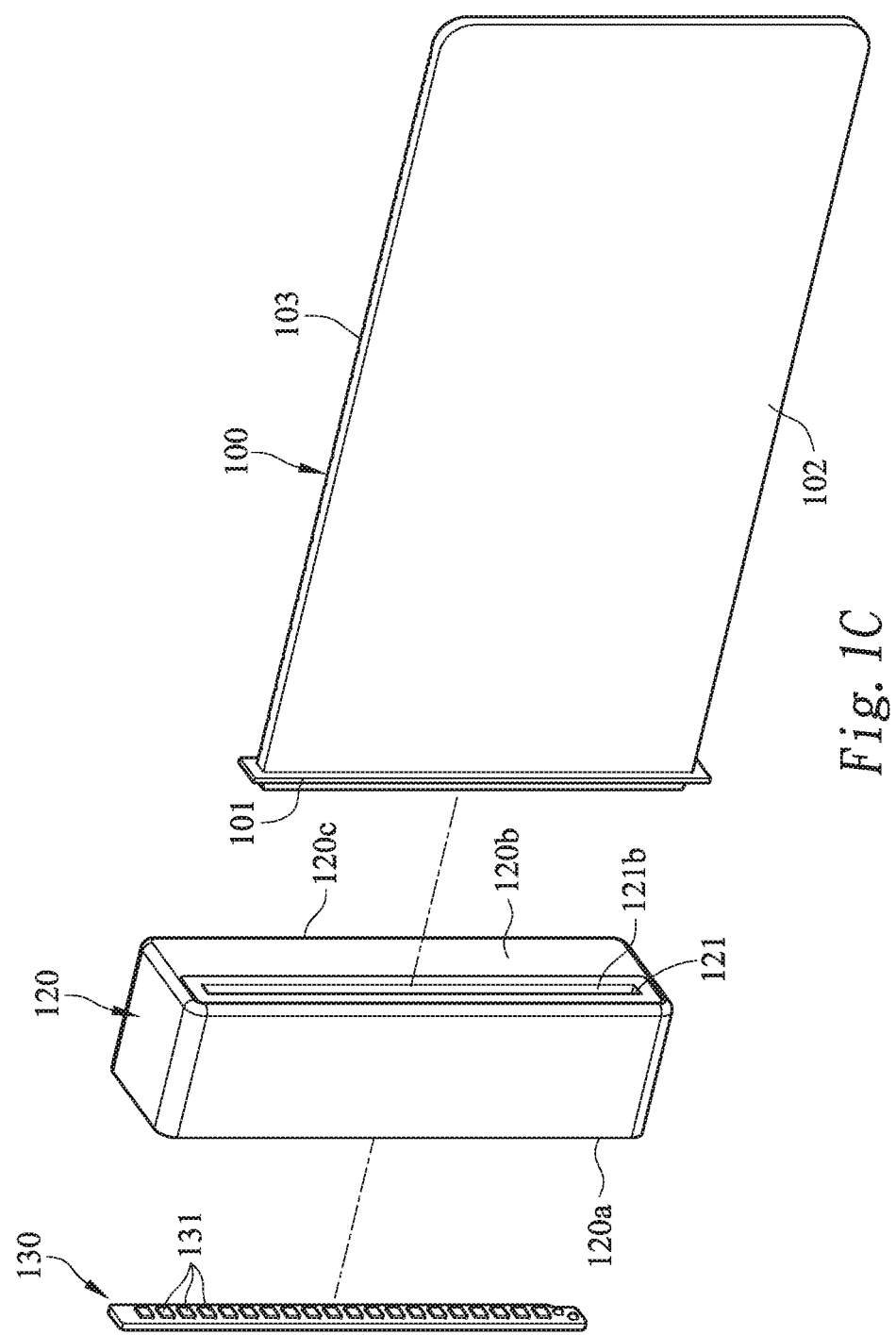
FIG. 1C is a schematic exploded view illustrating the lamp device as shown in FIG. 1A.
Figure 1D:
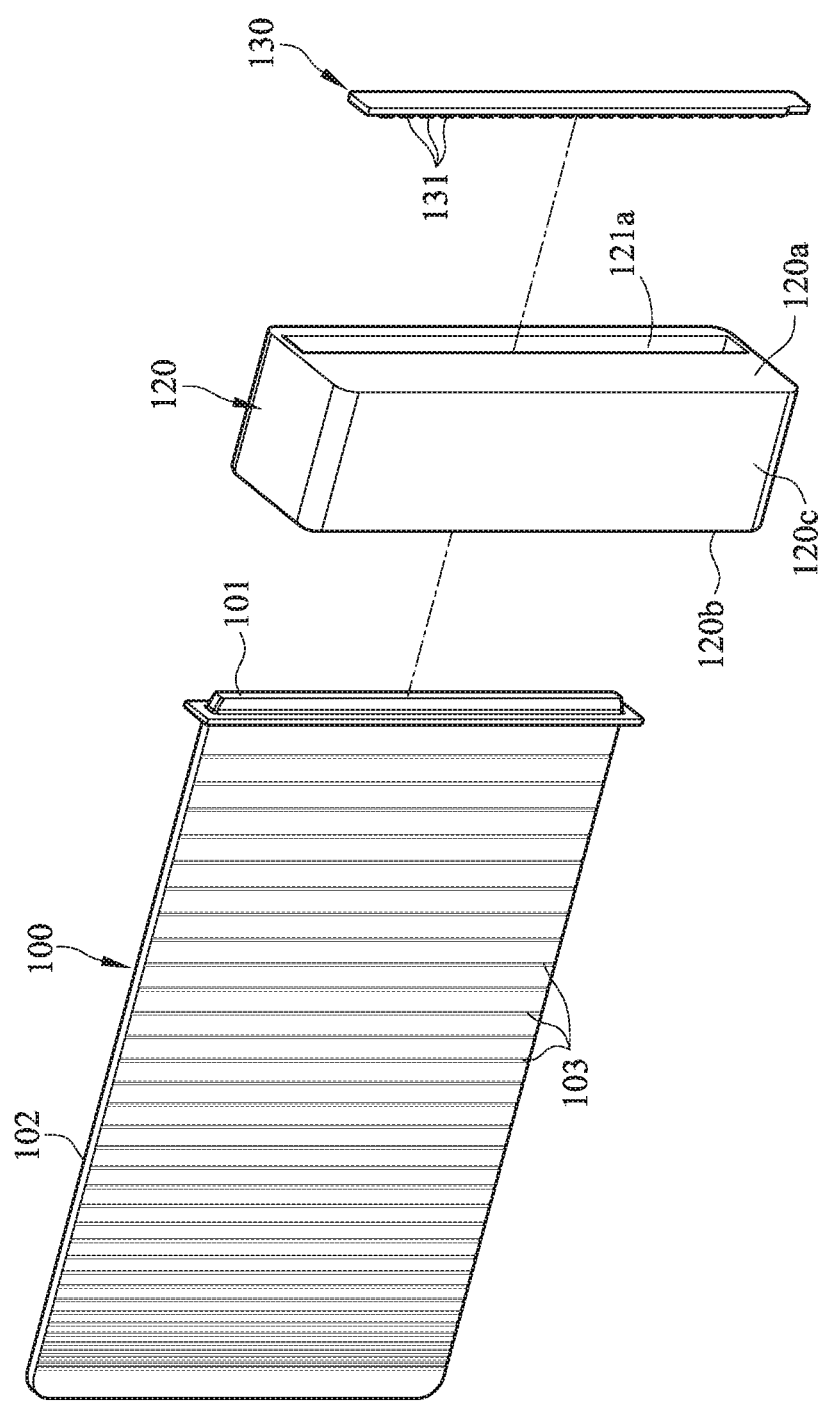
FIG. 1D is a schematic exploded view illustrating the lamp device as shown in FIG. 1A and taken along another viewpoint.

Please refer to FIGS. 1A to 1E. The lamp device 10 comprises a light-transmissible element 100 and a lamp body 150. The lamp body 150 comprises a coupling mechanism 120, a control circuit board 130 and a sensing element 140. In this embodiment, the left sides and the right sides of the light-transmissible element 100 and the coupling mechanism 120 are symmetric. Since the left sides and the right sides of the light-transmissible element 100 and the coupling mechanism 120 have the same structures, only the components at the right sides of the light-transmissible element 100 and the coupling mechanism 120 are shown in FIGS. 1C and 1D in order to describe the main technical features of the present invention.

In this embodiment, the light-transmissible element 100 comprises a light-inputting surface 101, a first light-outputting surface 102, a second light-outputting surface 103 and plural microstructures 110. The first light-outputting surface 102 and the second light-outputting surface 103 are arranged beside a first lateral edge 101a and a second lateral edge 101b of the light-inputting surface 101, respectively. Consequently, the first light-outputting surface 102 and the second light-outputting surface 103 are opposed to each other. The plural microstructures 110 are formed on the second light-outputting surface 103. The plural microstructures 110 are V-shaped optical refractive structures, U-shaped optical refractive structures, curvy optical refractive structures, or the combination thereof. In this embodiment, the microstructures 110 are V-shaped optical refractive structures. It is noted that the examples of the microstructures are not restricted. For example, an optical channel 810 is arranged between the first light-outputting surface 102 and the second light-outputting surface 103 for allowing the light beams to pass through.

In this embodiment, the light-transmissible element 100 has a sealed, solid and thin light-transmissible structure. It is noted that the structure of the light-transmissible element is not restricted. For example, in another embodiment, the light-transmissible element has a sealed and hollow light-transmissible structure, a semi-sealed and hollow light-transmissible structure or a semi-sealed and solid light-transmissible structure.

That is, the example of the structure of the light-transmissible element is not restricted. The light beams can be transmitted through and refracted by the light-transmissible element.

For example, in the light-transmissible element 100, the optical channel 810 is arranged between the first light-outputting surface 102 and the second light-outputting surface 103. After the light beam is received by the light-inputting surface 101, the light beam is transferred through the optical channel 810 and refracted by the V-shaped optical refractive structures on the second light-outputting surface 103. The light-transmissible element 100 of this embodiment has the sealed, solid and thin light-transmissible structure. The light beam is transferred through the sealed, solid and thin light-transmissible structure. That is, the optical channel 810 is the main body of the light-transmissible element 100. Since the main body of the light-transmissible element 100 has the light-transmissible property, the light beams can be transferred through the main body and then refracted.

In case that the light-transmissible element has a hollow light-transmissible structure (sealed or semi-sealed), the hollow gap between the first light-outputting surface and the second light-outputting surface is served as an optical channel for allowing the light beams to pass through.

Figure 1E:
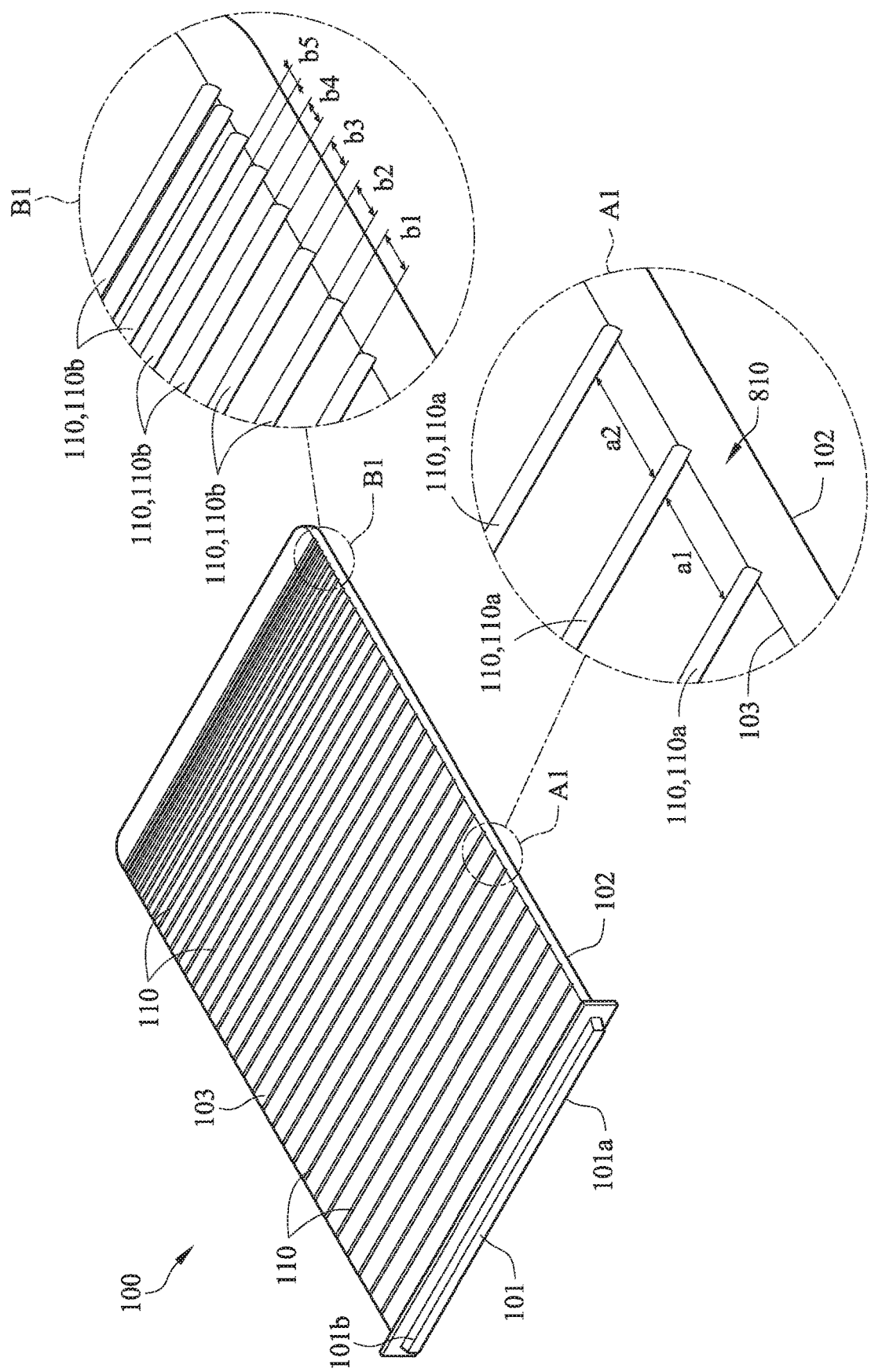
FIG. 1E is an enlarged view illustrating portions of the microstructures in the light-transmissible element.
Figure 1F:
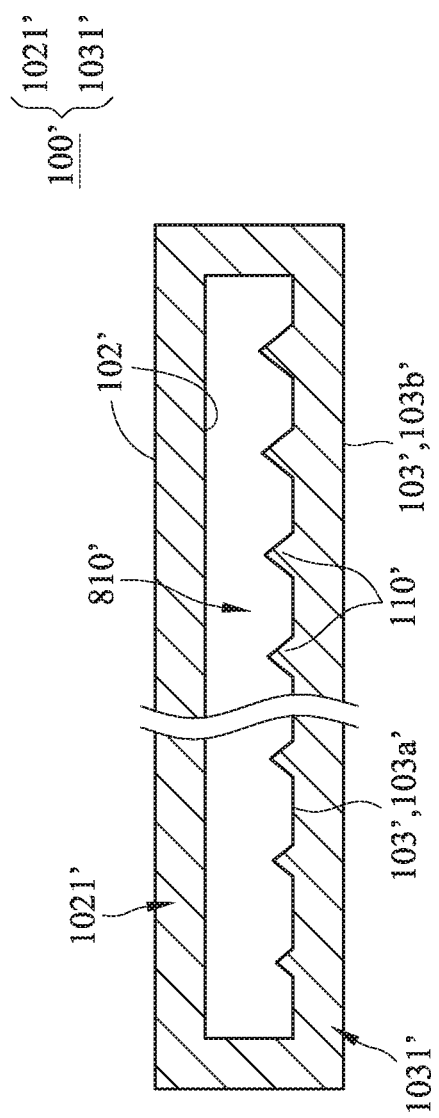
FIG. 1F is a schematic side view illustrating a variant example of the light-transmissible element according to the first embodiment of the present invention.

FIG. 1F is a schematic side view illustrating a variant example of the light-transmissible element according to the first embodiment of the present invention. As shown in FIG. 1F, the light-transmissible element 100' has a sealed hollow light-transmissible structure or a semi-sealed hollow light-transmissible structure with a first light-transmissible plate 1021' and a second light-transmissible plate 1031'. The first light-outputting surface 102' is formed on the first light-transmissible plate 1021'. The second light-outputting surface 103' is formed on the second light-transmissible plate 1031'. Consequently, the hollow gap between the first light-outputting surface 102' and the second light-outputting surface 103' is served as an optical channel 810'.

The second light-outputting surface 103' of the hollow light-transmissible element 100' comprises an inner side 103a' and an outer side 103b'. The inner side 103a' of the second light-outputting surface 103' is closer to the first light-outputting surface 102' than the outer side 103b' of the second light-outputting surface 103'. As shown in FIG. 1F, the plural microstructures 110' are formed on the inner side 103a' of the second light-outputting surface 103'. Alternatively, the plural microstructures 110' are formed on the outer side 103b' of the second light-outputting surface 103'.

Please refer to FIGS. 1A to 1E again. The coupling mechanism 120 comprises a first lateral surface 120a, a second lateral surface 120b, a third lateral surface 120c and a guiding slot 121. The guiding slot 121 has a first opening 121a and a second opening 121b. The first opening 121a and the second opening 121b are formed in the first lateral surface 120a and the second lateral surface 120b, respectively. That is, the guiding slot 121 is in communication with the coupling mechanism 120. Consequently, the light beam can be transferred from the first lateral surface 120a of the coupling mechanism 120 (i.e., the first opening 121a of the guiding slot 121) to the second lateral surface 120b of the coupling mechanism 120 (i.e., the second opening 121b of the guiding slot 121). Particularly, the guiding slot 121 is in communication with the coupling mechanism 120, and a portion of the light-transmissible element 100 is positioned in the guiding slot 121. Consequently, after the light beam is transferred through the guiding slot 121, the light beam is received by the light-inputting surface 101 and then refracted. It is noted that the example of the coupling mechanism is not restricted. For example, in another embodiment, the coupling mechanism is replaced by a position-limiting structure or a position-limiting means as long as the similar function of the coupling mechanism is achievable.

The control circuit board 130 comprises plural light-emitting elements 131. For example, the light-emitting elements 131 are light emitting diodes (LED). Under control of the control circuit board 130, the light-emitting elements 131 emit plural light beams. In this embodiment, the sensing element 140 is a passive infrared (PIR) motion sensor. The PIR motion sensor 140 is installed on a bottom of the lamp body 150. The PIR motion sensor 140 is electrically connected with the control circuit board 130. If an object is sensed by the PIR motion sensor 140, the control circuit board 130 controls the light-emitting elements 131 to emit the light beams. The example of the sensing element 140 is not restricted to the PIR motion sensor. For example, in another embodiment, the sensing element 140 is a microwave sensor or any other appropriate sensor.

The connecting relationships and the operating relationships between the above components will be described as follows. The coupling mechanism 120 is used for assembling and positioning the control circuit board 130 and the light-transmissible element 100. Consequently, the control circuit board 130 and the light-transmissible element 100 are connected to the first lateral surface 120a and the second lateral surface 120b of the coupling mechanism 120, respectively. Moreover, the control circuit board 130 and the light-transmissible element 100 are in communication with each other through the first opening 121a and the second opening 121b of the guiding slot 121. Consequently, the light beam from the plural light-emitting elements 131 of the control circuit board 130 can be received by the light-inputting surface 101 of the light-transmissible element 100. In this embodiment, the light-emitting elements 131 are located outside the light-transmissible element 100. Moreover, the light-emitting element 131 is separated from the light-inputting surface 101 by a specified distance. It is noted that numerous modifications and alterations may be made while retaining the teachings of the invention. For example, in another embodiment, the plural light-emitting elements 131 are arranged near the light-inputting surface 101. Consequently, the amount of the light to be inputted into the light-inputting surface 101 is increased.

After the light beams are received by the light-transmissible element 100 through the light-inputting surface 101, the light beams are received and refracted by the V-shaped optical refractive structures on the second light-outputting surface 103. Consequently, a first luminous flux refracted out of the first light-outputting surface is higher than a second luminous flux refracted out of the second light-outputting surface. In other words, the light beams are inputted into the light-inputting surface 101, the first light-outputting surface 102 is a main light output surface for outputting the light beams, and the second light-outputting surface 103 is a light refractive surface for refracting the light beam. Moreover, since the light beams are received and refracted by the V-shaped optical refractive structures 110 on the second light-outputting surface 103, the first luminous flux of the first light-outputting surface 102 is higher than the second luminous flux of the second light-outputting surface 103.

In an embodiment, the light-inputting surface 101 and the second light-outputting surface 103 are vertical to each other. Consequently, the light beams are received and refracted by the received by the V-shaped optical refractive structures 110 in a partially vertical manner. In another embodiment, the light-inputting surface 101 and the second light-outputting surface 103 are non-parallel to each other. Consequently, the light beams are received and refracted by the received by the V-shaped optical refractive structures 110 in a partially non-parallel manner. In other words, the travelling direction of the plural light beams and the plural microstructures 110 are in a vertical interference relationship or a non-parallel interference relationship.

That is, the light beams can be outputted from both of the first light-outputting surface 102 and the second light-outputting surface 103. It means that the light beams can be outputted from the two light-outputting surfaces. Preferably but not exclusively, the first luminous flux of the first light-outputting surface 102 is at least 2-4 times the second luminous flux of the second light-outputting surface 103. The relationship between the first luminous flux and the second luminous flux may be varied according to the practical requirements. Hereinafter, the relationship between the first luminous flux L1 and the second luminous flux L2 will be described in a second embodiment of the present invention.

Moreover, every two V-shaped optical refractive structures 110 of the V-shaped optical refractive structures 110 are separated from each other by a spacing interval. In an embodiment, all of the spacing intervals between the V-shaped optical refractive structures 110 are identical. In another embodiment, some of the spacing intervals between the V-shaped optical refractive structures 110 are identical. In another embodiment, all of the spacing intervals between the V-shaped optical refractive structures 110 are different. Consequently, the luminous flux (i.e., the light extraction efficiency) and the light output range of the overall lamp device 10 are increased.

Please refer to FIG. 1E. In this embodiment, the light-transmissible element 100 has a flat light-transmissible structure. These V-shaped optical refractive structures are arranged and distributed on the second light-outputting surface 103. The V-shaped optical refractive structures on the second light-outputting surface 103 can be classified into A1-zone V-shaped optical refractive structures 110a and B1-zone V-shaped optical refractive structures 110b. The A1-zone V-shaped optical refractive structures 110a are closer to the light-inputting surface 101 than the B1-zone V-shaped optical refractive structures 110b. That is, the A1-zone V-shaped optical refractive structures 110a are located near the light sources, and the B1-zone V-shaped optical refractive structures 110b are away from the light sources.

In the A1 zone, the spacing intervals between adjacent V-shaped optical refractive structures 110a are equal. As shown in FIG. 1E, the spacing interval a1 and the spacing interval a2 are equal. In the B1 zone, the spacing intervals between adjacent V-shaped optical refractive structures 110b are gradually decreased along the direction away from the light-inputting surface 101. As shown in FIG. 1E, the relationships between the spacing intervals b1, b2, b3, b4 and b5 may be expressed as b5<b4<b3<b2<b1.

That is, the spacing intervals a1, a2, b1, b2, b3, b4 and b5 between the adjacent V-shaped optical refractive structures 110, 110a and 110b may be adjusted according to the lighting requirements of the lamp device. The spacing intervals a1, a2, b1, b2, b3, b4 and b5 may be identical, gradually decreased or gradually increased along the direction away from the light-emitting elements 131 (i.e., along the direction away from the light-inputting surface 101). In such way, the V-shaped optical refractive structures are arranged and distributed on the second light-outputting surface 103.

As mentioned above, the light beams are received and refracted by the V-shaped optical refractive structures 110, 110a and 110b of the light-transmissible element 100. The refracted light beams can be uniformly distributed on the first light-outputting surface 102. Consequently, the luminous flux (i.e., the light extraction efficiency) and the light output range of the light beams outputted from the first light-outputting surface 102 are increased, and the efficacy of reducing the light spots is enhanced.

In the first embodiment, the spacing intervals a1, a2, b1, b2, b3, b4 and b5 may be adjusted according to the microstructures of the light-transmissible element. It is noted that numerous modifications and alterations may be made while retaining the teachings of the invention. A second embodiment of the present invention will be described as follows.

Figure 2A:
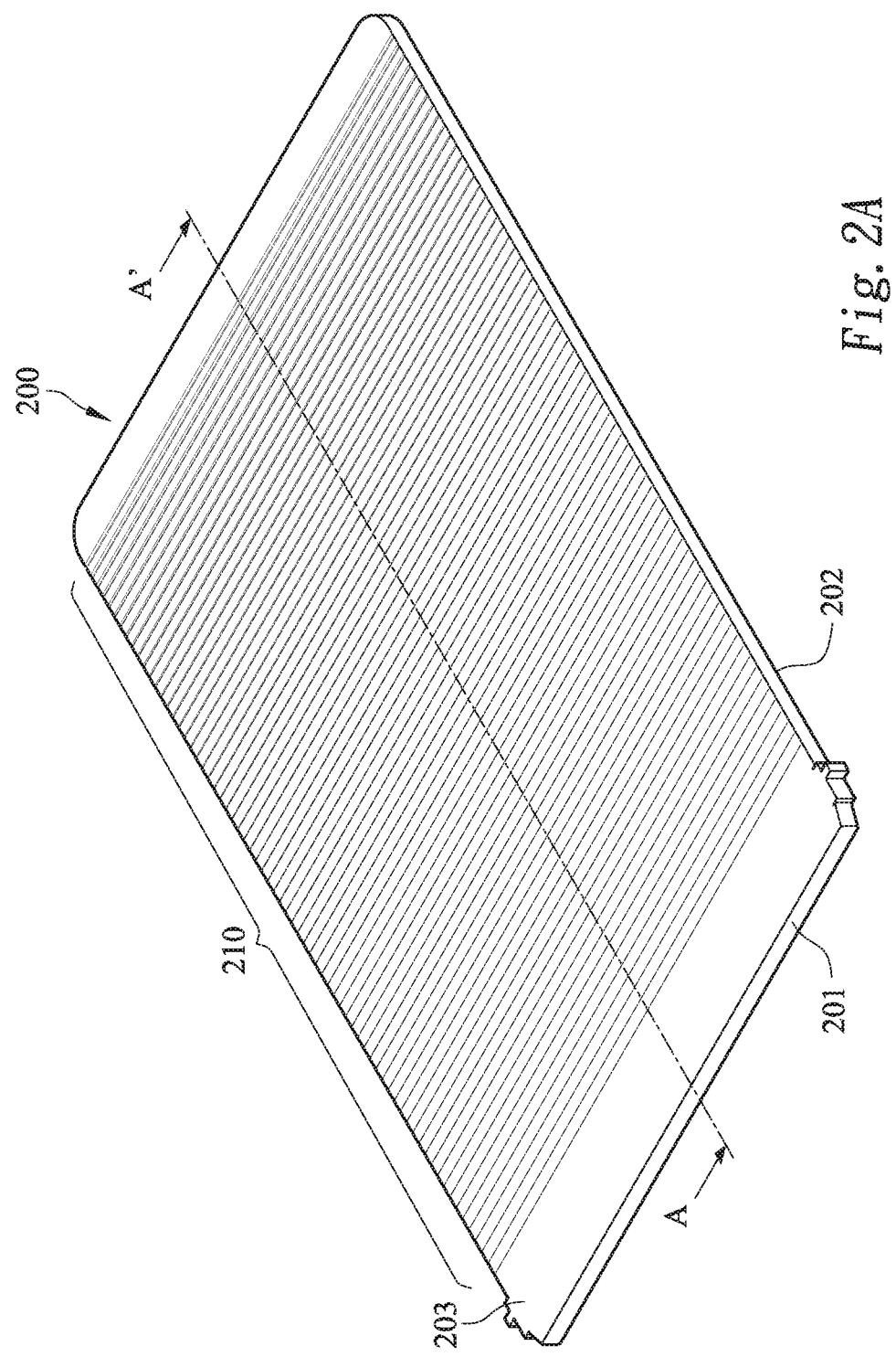
FIG. 2A is a schematic perspective view illustrating a light-transmissible element according to a second embodiment of the present invention

FIGS. 2A to 2D schematically illustrate the perspective view and the partially enlarged cross-sectional view of some components of a light-transmissible element according to a second embodiment of the present invention, and illustrates the luminous fluxes generated by the light-transmissible element as shown in FIG. 2A.

As shown in FIGS. 2A to 2D, the light-transmissible element 200 of this embodiment comprises a light-inputting surface 201, a first light-outputting surface 202, a second light-outputting surface 203 and plural microstructures 210. The first light-outputting surface 202 and the second light-outputting surface 203 are arranged beside a first lateral edge and a second lateral edge of the light-inputting surface, respectively. Consequently, the first light-outputting surface 102 and the second light-outputting surface 103 are opposed to each other. Moreover, an optical channel 820 is arranged between the first light-outputting surface 202 and the second light-outputting surface 203 for allowing the light beams to pass through. Similarly, the plural microstructures 210 are formed on the second light-outputting surface 203. In this embodiment, the microstructures 210 are V-shaped optical refractive structures. For example, the V-shaped optical refractive structure 210a1 comprises a first refractive surface 211a and a second refractive surface 211b. An acute angle θ1 is formed between the first refractive surface 211a and the second light-outputting surface. An acute angle θ2 is formed between the second refractive surface 211b and the second light-outputting surface.

The second embodiment clearly describes that the depth of each V-shaped optical refractive structure 210 relative to the second light-outputting surface 203 and the cutting surface width of each V-shaped optical refractive structure 210 relative to the second light-outputting surface 203 can increase the light extraction quality of the overall V-shaped optical refractive structure 210. Consequently, the luminous flux and the light output range of the light beams outputted from the first light-outputting surface are effectively increased, and the efficacy of reducing the light spots is enhanced.

Figure 2B:
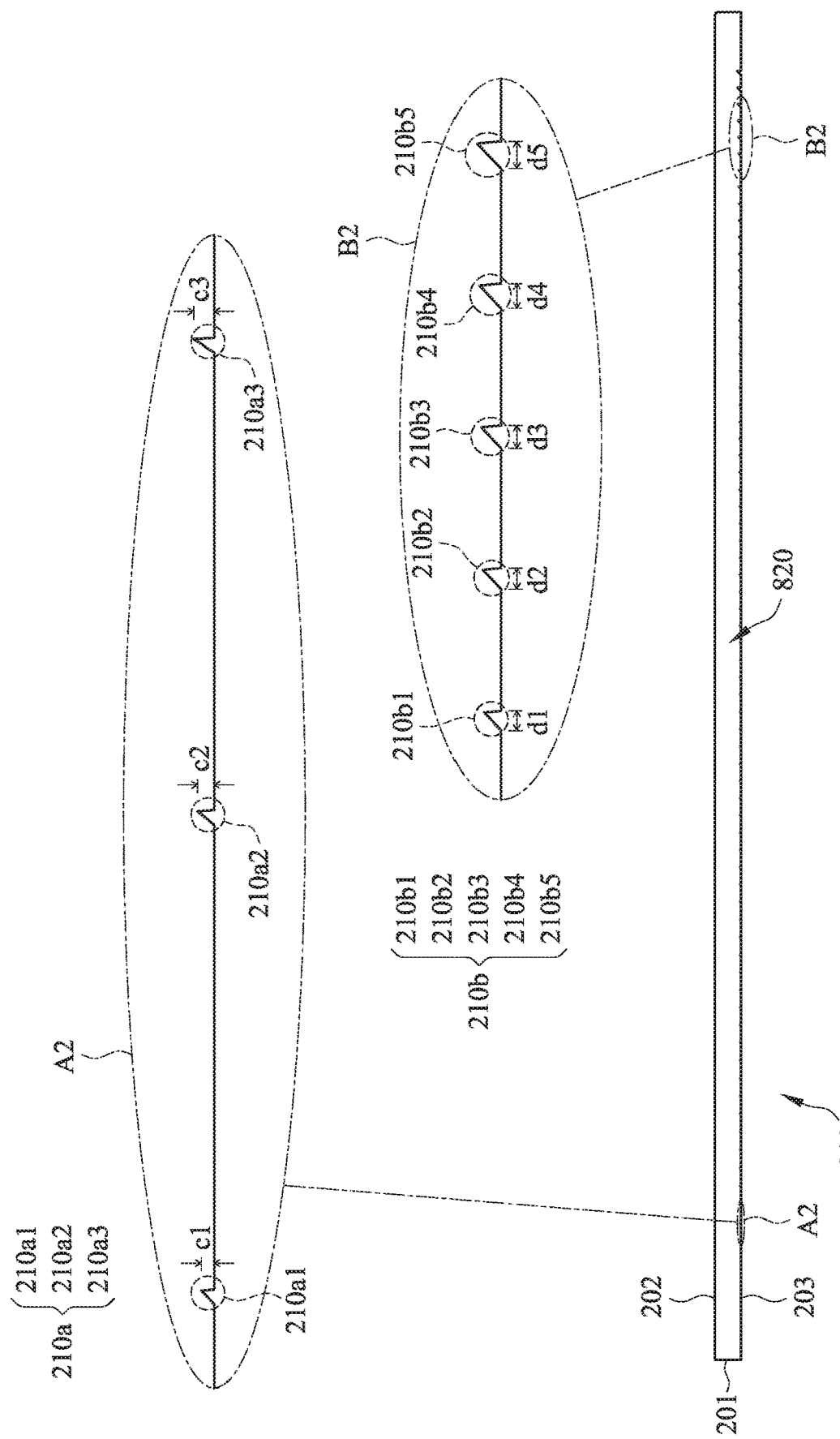
FIG. 2B is a schematic cross-sectional view illustrating a portion of the light-transmissible element as shown in FIG. 2A and taken along the line A-A'.

As shown in FIG. 2B, the V-shaped optical refractive structures 210 can be classified into A2-zone V-shaped optical refractive structures 210a and B2-zone V-shaped optical refractive structures 210b. The A2-zone V-shaped optical refractive structures 210a comprise V-shaped optical refractive structures 210a1, 210a2 and 210a3. The B2-zone V-shaped optical refractive structures 210b comprise V-shaped optical refractive structures 210b1, 210b2, 210b3, 210b4 and 210b5.

The V-shaped optical refractive structures 210a1, 210a2 and 210a3 are located near the light-inputting surface 201. The V-shaped optical refractive structures 210b1, 210b2, 210b3, 210b4 and 210b5 in the B2 zone are away from the light-inputting surface 201. That is, the V-shaped optical refractive structures 210a1, 210a2 and 210a3 in the A2 zone are closer to the light source than the V-shaped optical refractive structures 210b1, 210b2, 210b3, 210b4 and 210b5 in the B2 zone.

As shown in FIG. 2B, the depths c1, c2 and c3 of the V-shaped optical refractive structures 210a1, 210a2 and 210a3 in the A2 zone relative to the second light-outputting surface 203 are gradually increased along the direction away from the light-inputting surface 201. The relationships between the depths c1, c2 and c3 may be expressed as: $c1<c2<c3$. Moreover, the cutting surface widths d1, d2, d3, d4 and d5 of the V-shaped optical refractive structures 210b1, 210b2, 210b3, 210b4 and 210b5 in the B2 zone relative to the second light-outputting surface 203 are gradually increased. The relationships between the cutting surface widths d1, d2, d3, d4 and d5 may be expressed as: $d1<d2<d3<d4<d5$.

Figure 2C:
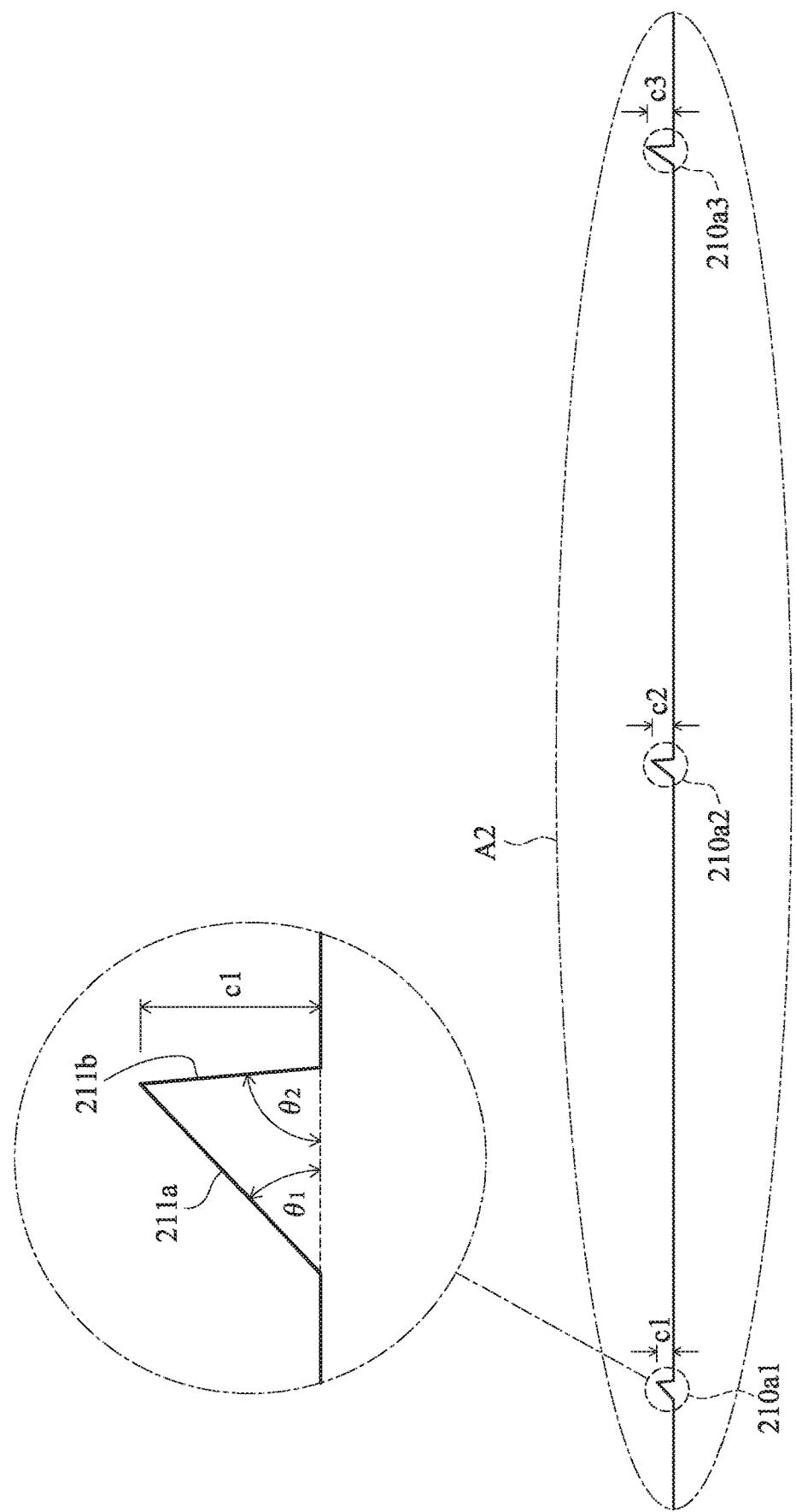
FIG. 2C is a schematic cross-sectional view illustrating the enlarged portion of the region A2 as shown in FIG. 2B.
Figure 2D:
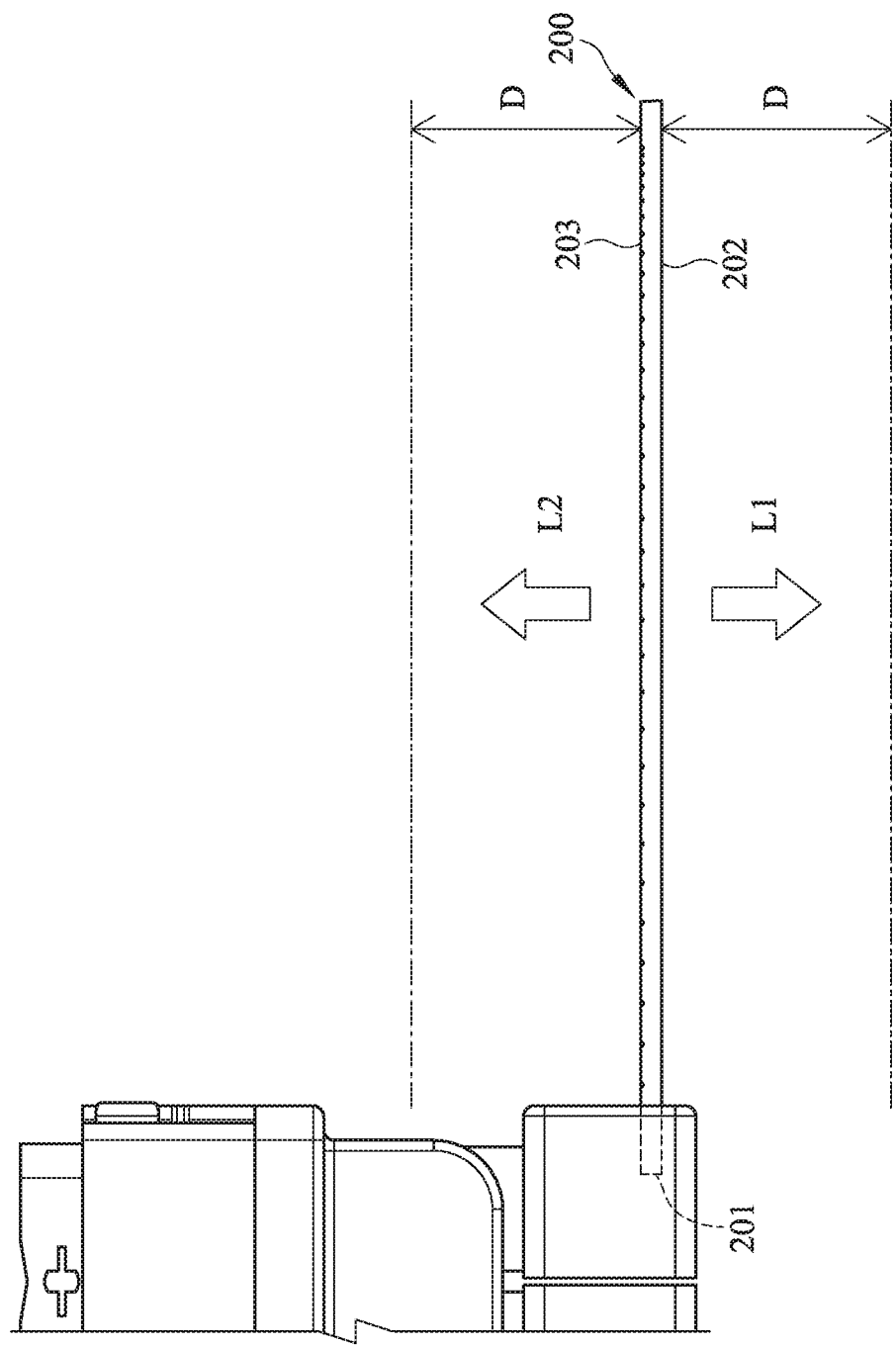
FIG. 2D schematically illustrates luminous fluxes generated by the light-transmissible element as shown in FIG. 2A.

Please refer to FIGS. 2C and 2D. In the V-shaped optical refractive structure 210a1, the acute angle θ1 between the first refractive surface 211a and the second light-outputting surface 203 is smaller than the acute angle θ2 between the second refractive surface 211b and the second light-outputting surface 203. That is, the refractive area of the first refractive surface 211a is larger than the refractive area of the second refractive surface 211b. Consequently, the luminous flux L1 received and refracted by the first refractive surface 211a is higher than the luminous flux L2 received and refracted by the second refractive surface 211b. In this context, the luminous flux is the so-called light extraction efficiency of the light beams. That is, the light extraction efficiency of the first light-outputting surface 202 is higher than the light extraction efficiency of the second light-outputting surface 203.

In this embodiment, the adjacent V-shaped optical refractive structures 210 are in a discontinuous arrangement. In another embodiment, the adjacent V-shaped optical refractive structures 210 are in a continuous arrangement, a discontinuous arrangement or a partially-continuous arrangement. That is, the arrangements of the adjacent V-shaped optical refractive structures may be varied according to the practical requirements of the light-transmissible element and the light source.

It is noted that numerous modifications and alterations may be made while retaining the teachings of the invention. That is, the structural designs and specifications of the components may be varied according to the practical requirements.

For example, the structure of the light-transmissible element is not restricted to the flat light-transmissible structure. In another embodiment, the light-transmissible element has one of an arc-shaped light-transmissible structure and a curvy light-transmissible structure. Moreover, the appearance and shape of the light-transmissible element may be varied. Consequently, the spacing intervals between the adjacent microstructures, the depth of each microstructure relative to the second light-outputting surface, the cutting surface width of each microstructure and the acute angles may be designed according to the practical product requirements and the lighting requirements. The above examples are presented herein for purpose of illustration and description only. It is not intended to be exhaustive or to be limited to the precise form disclosed.

Figure 3:
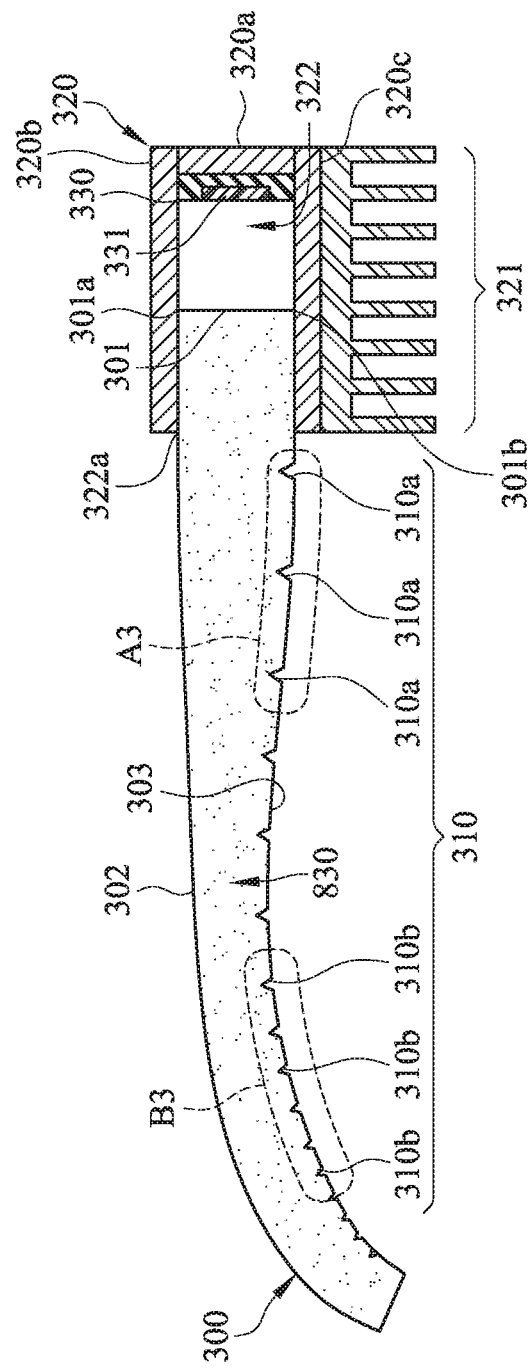
FIG. 3 is a schematic cross-sectional view illustrating a portion of a lamp device according to a third embodiment of the present invention.
Figure 4:
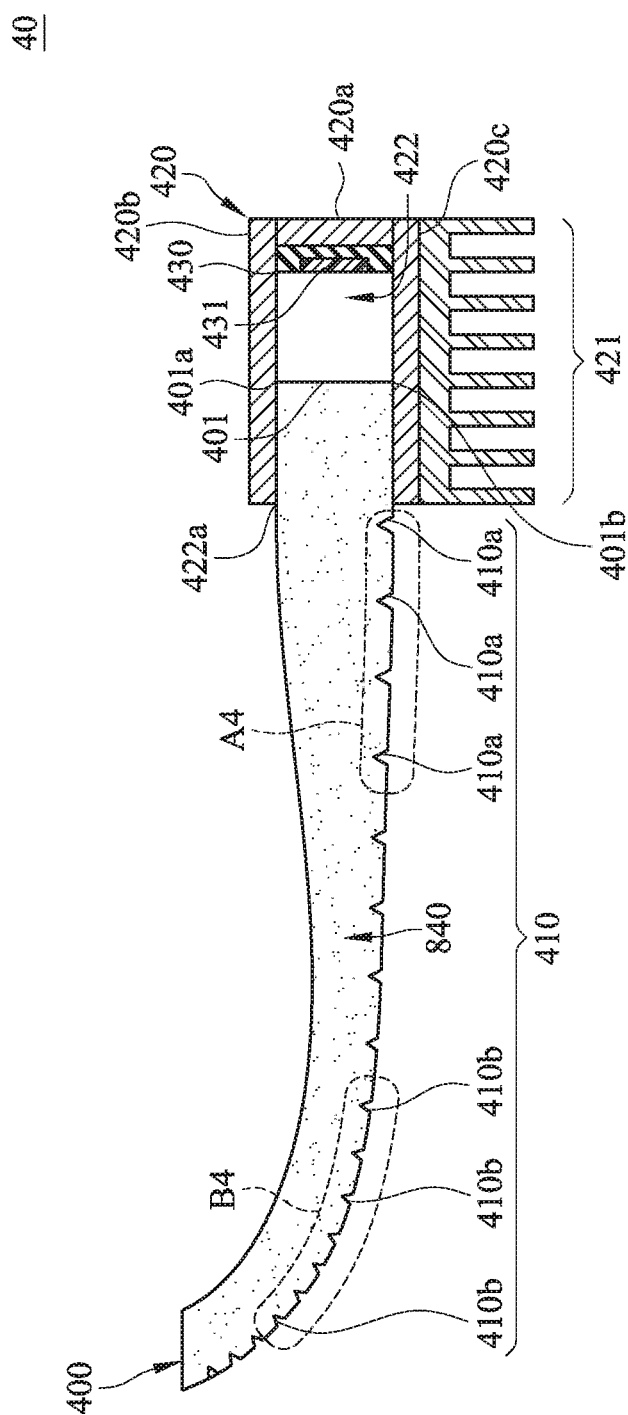
FIG. 4 is a schematic cross-sectional view illustrating a portion of a lamp device according to a fourth embodiment of the present invention.

A third embodiment and a fourth embodiment of the present invention will be described as follows. FIG. 3 is a schematic cross-sectional view illustrating a portion of a lamp device according to a third embodiment of the present invention. FIG. 4 is a schematic cross-sectional view illustrating a portion of a lamp device according to a fourth embodiment of the present invention.

In FIG. 3, a portion of the lamp device 30 in the third embodiment is shown to describe the concepts of the present invention. Similarly, the lamp device 30 comprises a light-transmissible element 300, a coupling mechanism 320 and a control circuit board 330. The light-transmissible element 300 comprises a light-inputting surface 301, a first light-outputting surface 302, a second light-outputting surface 303 and plural microstructures 310. For example, the microstructures 310 are V-shaped optical refractive structures. The first light-outputting surface 302 and the second light-outputting surface 303 are arranged beside a first lateral edge 301a and a second lateral edge 301b of the light-inputting surface 301, respectively. Consequently, the first light-outputting surface 302 and the second light-outputting surface 303 are opposed to each other. Moreover, an optical channel 830 is arranged between the first light-outputting surface 302 and the second light-outputting surface 303 for allowing the light beams to pass through. The plural V-shaped optical refractive structures 310 are formed on the second light-outputting surface 303. The V-shaped optical refractive structures 310 can be classified into A3-zone V-shaped optical refractive structures 310a and B3-zone V-shaped optical refractive structures 310b.

In this embodiment, the lamp device 30 further comprises plural fins 321. The coupling mechanism 320 comprises a first lateral surface 320a, a second lateral surface 320b, a third lateral surface 320c and a guiding slot 322. The plural fins 321 are arranged on the third lateral surface 320c. The guiding slot 322 has an opening 322a. Moreover, the guiding slot 322 is arranged between the second lateral surface 320b and the third lateral surface 320c. The opening 322a is combined with the light-transmissible element 300. In addition, the light-inputting surface 301 is tightly fitted into the opening 322a. The control circuit board 330 comprises at least one light-emitting element 331. For example, the light-emitting element 331 is a light emitting diode (LED). Under control of the control circuit board 330, the at least one light-emitting element 331 emits plural light beams. The plural light beams are transferred to the light-inputting surface 301 through the guiding slot 322 while avoiding the light leakage.

The A3 zone is located near the light-inputting surface 301. In the A3 zone, the spacing intervals between adjacent V-shaped optical refractive structures 310a are equal. The B3 zone is located away from the light-inputting surface 301. In the B3 zone, the spacing intervals between adjacent V-shaped optical refractive structures 310b are gradually decreased along the direction away from the at least one light-emitting element 331. Consequently, the luminous flux of the light beams outputted from the first light-outputting surface 302 of the overall lamp device 30 is increased, and the efficacy of reducing the light spots is enhanced.

In comparison with the above embodiment, the light-transmissible element 300 of this embodiment is an arc-shaped light-transmissible element 300. Due to the appearance of the arc-shaped light-transmissible element 300, the first light-outputting surface 302 is a convex surface and the second light-outputting surface 303 is a concave surface. Moreover, the optical channel 830 is arranged between the first light-outputting surface 302 and the second light-outputting surface 303 is an arc-shaped optical channel. The plural V-shaped optical refractive structures 310 are arranged and distributed on the second light-outputting surface 303 (i.e., the concave structure). After the light beams are received and refracted by the V-shaped optical refractive structures 310, portions of the light beams are scattered out of the first light-outputting surface 302 (i.e., the convex surface). Consequently, the light output range of the overall lamp device 30 is increased. For example, the light-transmissible element 300 may be applied to an outdoor lamp or a street lamp. Since the V-shaped optical refractive structures 310 are arranged and distributed on the concave structure, the light beams are scattered outside. Consequently, the overall light output range is enhanced, and the visual field of the pedestrian in the night is increased.

In case that the positions of the V-shaped optical refractive structures are changed, the lighting effect is adjustable. In FIG. 4, some components of the lamp 40 in the fourth embodiment are shown to describe the generation of other lighting effect.

In FIG. 4, the lamp device of this embodiment comprises a light-transmissible element 400, a coupling mechanism 420 and a control circuit board 430. The light-transmissible element 400 comprises a light-inputting surface 401, a first light-outputting surface 402, a second light-outputting surface 403 and plural microstructures 410. For example, the microstructures 410 are V-shaped optical refractive structures. The first light-outputting surface 402 and the second light-outputting surface 403 are arranged beside a first lateral edge 401a and a second lateral edge 401b of the light-inputting surface 401, respectively. Consequently, the first light-outputting surface 402 and the second light-outputting surface 403 are opposed to each other. Moreover, an optical channel 840 is arranged between the first light-outputting surface 402 and the second light-outputting surface 403 for allowing the light beams to pass through. The plural V-shaped optical refractive structures 410 are formed on the second light-outputting surface 403. The V-shaped optical refractive structures 410 can be classified into A4-zone V-shaped optical refractive structures 410a and B4-zone V-shaped optical refractive structures 410b.

Similarly, the coupling mechanism 420 comprises a first lateral surface 420a, a second lateral surface 420b, a third lateral surface 420c, plural fins 421 and a guiding slot 422. The plural fins 421 are arranged on the third lateral surface 420c. The guiding slot 422 has an opening 422a. Moreover, the guiding slot 422 is arranged between the second lateral surface 420b and the third lateral surface 420c. The opening 422a is combined with the light-transmissible element 400. In addition, the light-inputting surface 401 is tightly fitted into the opening 422a. The control circuit board 430 comprises at least one light-emitting element 431. For example, the light-emitting element 431 is a light emitting diode (LED). Under control of the control circuit board 430, the at least one light-emitting element 431 emits plural light beams. The plural light beams are transferred to the light-inputting surface 401 through the guiding slot 422 while avoiding the light leakage.

The A4 zone is located near the light-inputting surface 401. In the A4 zone, the spacing intervals between adjacent V-shaped optical refractive structures 410a are equal. The B4 zone is located away from the light-inputting surface 401. In the B4 zone, the spacing intervals between adjacent V-shaped optical refractive structures 410b are gradually decreased along the direction away from the at least one light-emitting element 431. Consequently, the luminous flux of the light beams outputted from the first light-outputting surface 402 of the overall lamp device is increased, and the efficacy of reducing the light spots is enhanced.

In comparison with the above embodiment, the light-transmissible element 400 of this embodiment is an arc-shaped light-transmissible element. Due to the appearance of the arc-shaped light-transmissible element, the first light-outputting surface 402 is a concave surface and the second light-outputting surface 403 is a convex surface. Moreover, the optical channel 840 is arranged between the first light-outputting surface 402 and the second light-outputting surface 403 is an arc-shaped optical channel. The plural V-shaped optical refractive structures 410 are arranged and distributed on the second light-outputting surface 403 (i.e., the convex structure). After the light beams are received and refracted by the V-shaped optical refractive structures 410, portions of the light beams are centralized to the first light-outputting surface 402 (i.e., the concave surface) from outside to inside. Consequently, the light output range of the overall lamp device 40 can be centralized to a specified site. For example, the light-transmissible element 400 may be applied to a desk lamp. Since the V-shaped optical refractive structures 410 are arranged and distributed on the convex structure, the light beams are centralized to the desk surface for assists the user in reading.

Especially, the type of the microstructures may be determined according to the appearance and the shape of the light-transmissible element. For example, the microstructures are V-shaped optical refractive structures, U-shaped optical refractive structures, curvy optical refractive structures, or the combination thereof. Moreover, the spacing interval between every two adjacent microstructures, the depth of each microstructure relative to the second light-outputting surface, the cutting surface width of each microstructure and the acute angles may be designed according to the appearance of the light-transmissible element and the installation position of the light-emitting element.

In case that the light-transmissible element has a curvy light-transmissible structure, the spacing interval between every two adjacent microstructures is gradually decreased and increased according to the convex surface and the concave surface of the second light-outputting surface (i.e., the light refractive surface). Alternatively, in case that the plural light-emitting elements are located at two lateral sides of the light-transmissible element, the spacing interval between every two adjacent microstructures is gradually decreased along the two lateral sides and in the direction toward the middle region of the light-transmissible element. Moreover, the overall height and the cutting surface widths of the microstructures may be designed according to the radian of the curvy surface. That is, the depth of each microstructure relative to the second light-outputting surface, the cutting surface width of each microstructure and the acute angles may be adjusted.

That is, the height of the microstructure (i.e., the cutting surface depth) is gradually increased in the direction away from the plural light-emitting elements. It means that the cutting surface depth is gradually increased. For example, in the light-transmissible element 100 of the first embodiment, the heights of the B1-zone V-shaped optical refractive structures 110b are larger than the heights of the A1-zone V-shaped optical refractive structures 110a. Similarly, in the light-transmissible element 200 of the second embodiment, the heights of the B2-zone V-shaped optical refractive structures 210b are larger than the heights of the A2-zone V-shaped optical refractive structures 210a. In other words, the microstructures of the present invention may be designed according to the spacing interval between every two adjacent microstructures, the acute angle, the height and the cutting surface width of each microstructure, and installation positions of the plural light-emitting elements.

In the above embodiments, the appearance of the light-transmissible element has a rectangular shape. In some other embodiments, the light-transmissible element has a circular shape, an elliptical shape, a polygonal shape or an irregular shape. For example, the light-transmissible element has a triangular shape, a quadrangular shape, a pentagonal shape or a hexagonal shape. Alternatively, the light-transmissible element has the shape of a special flower, the shape of a cloud or a geometric shape. In case that the appearance of the light-transmissible element has the circular shape, the elliptical shape or the irregular shape, the installation positions of the light-emitting element may be located at the midpoint of the light-transmissible element. In case that the V-shaped optical refractive structures, the U-shaped optical refractive structures and/or the curvy optical refractive structures are selected, the light-transmissible element is located at the midpoint and the V-shaped optical refractive structures, the U-shaped optical refractive structures and/or the curvy optical refractive structures are arranged radially on the second light-outputting surface (i.e., the light refractive surface).

In case that the light-transmissible element has a semispherical shape, a spherical shape or a special three-dimensional shape, the designs of the microstructures of the light-transmissible element may be adjusted according to the installation position of the at least one light-emitting element or plural light sources. Consequently, the light-transmissible element is selectively in one of plural states in response to the intensity of the light beams from the light source. For example, the light-transmissible element may be selectively in a visual penetration state, an illumination state or a partially illumination state. Under this circumstance, the optically visual effects of the light-transmissible element are diverse.

Figure 5:
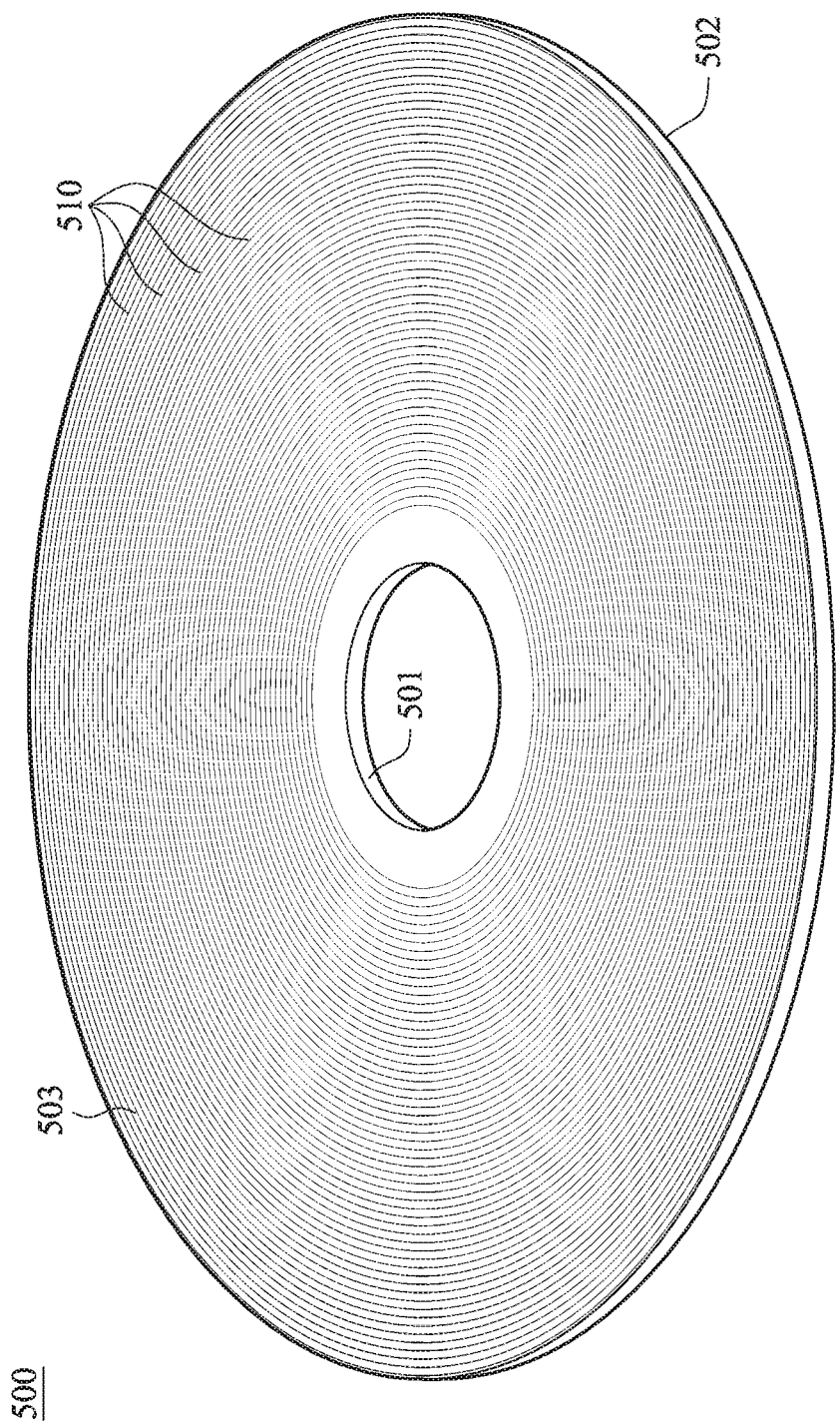
FIG. 5 is a schematic perspective view illustrating a light-transmissible element according to a fifth embodiment of the present invention.
Figure 6:
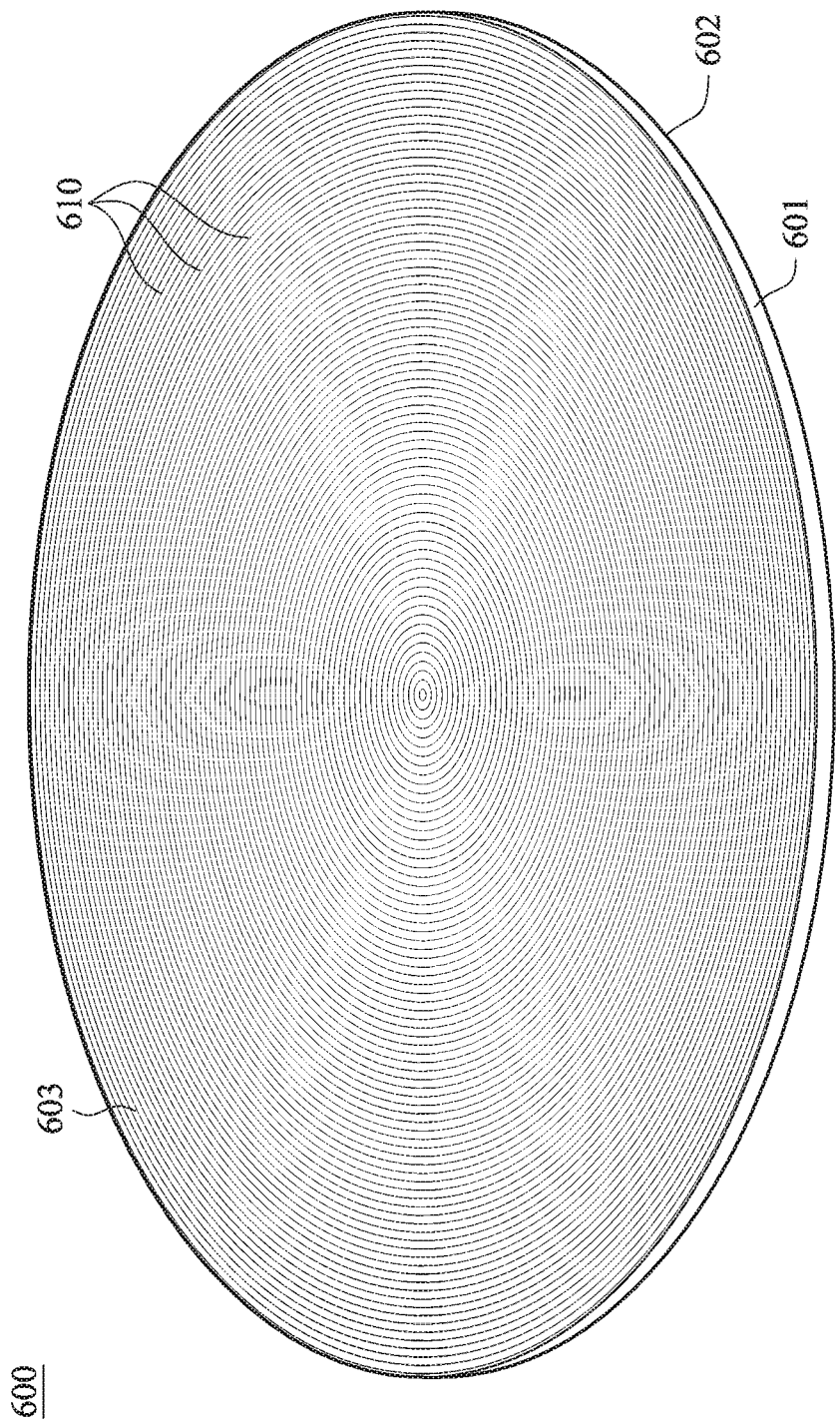
FIG. 6 is a schematic perspective view illustrating a portion of a light-transmissible element according to a sixth embodiment of the present invention.

A fifth embodiment and a sixth embodiment of the present invention will be described as follows. Please refer to FIGS. 5 and 6. FIG. 5 is a schematic perspective view illustrating a light-transmissible element according to a fifth embodiment of the present invention. FIG. 6 is a schematic perspective view illustrating a light-transmissible element according to a sixth embodiment of the present invention.

As shown in FIG. 5, the light-transmissible element 500 of this embodiment is a circular light-transmissible element 500. The light-transmissible element 500 comprises a light-inputting surface 501, a first light-outputting surface 502, a second light-outputting surface 503 and plural microstructures 510. The light-transmissible element 500 is located near a light source. The light source is located at or near the light-inputting surface 501. That is, the light source is located at the center of the light-transmissible element 500. The spacing interval between every two adjacent microstructures 510 is gradually decreased in the outward direction and away from the light-inputting surface 501. In addition, the depth and the cutting surface width of each microstructure 510 are gradually increased in the outward direction and away from the light-inputting surface 501. That is, the cutting depth and the width of each microstructure 510 are gradually increased in the outward direction and away from the center.

As shown in FIG. 6, the light-transmissible element 600 of this embodiment is also a circular light-transmissible element 600. The light-transmissible element 600 comprises a light-inputting surface 601, a first light-outputting surface 602, a second light-outputting surface 603 and plural microstructures 610. The light-transmissible element 500 is located near a light source. In comparison with the above embodiment, the light-inputting surface 601 is located at the periphery of the circular light-transmissible element 600. The light beams to be refracted from the periphery to the center of the circular light-transmissible element 600 are received by the light-inputting surface 601. In other words, the light-emitting element is located near the periphery (i.e., the light-inputting surface 601). Moreover, the light beams generated by the light-emitting element are transferred toward the center of the circular light-transmissible element 600.

In other words, the travelling direction of the plural light beams and the plural microstructures 610 are in a vertical interference relationship or a non-parallel interference relationship. The light beams refracted by the first light-outputting surface 602 has a first luminous flux. The light beams refracted by each second light-outputting surface 603 has a second luminous flux. Moreover, the first luminous flux is higher than the second luminous flux. According to the vertical interference relationship, the plural microstructures 610 are completely or partially vertical to the light beams to receive and refract the light beams. According to the vertical interference relationship, the plural microstructures 610 are completely or partially non-parallel to the light beams to receive and refract the light beams.

The spacing interval between every two adjacent microstructures 610 is gradually decreased in the inward direction and away from the light-inputting surface 601. In addition, the depth and the cutting surface width of each microstructure 610 are gradually increased in the inward direction and away from the light-inputting surface 601. That is, the cutting depth and the width of each microstructure 610 are gradually increased in the inward direction and away from the center.

From the above descriptions, the plural microstructures are formed on the second light-outputting surface of the light-transmissible element. The plural microstructures receive and refract the plural light beams. Consequently, the first luminous flux of the light beams refracted by the first light-outputting surface is obviously higher than the second luminous flux of the light beams refracted by the second light-outputting surface. According to the situation of receiving or not receiving the light beams, the light-transmissible element is selectively in the visual penetration state or the illumination state. Hereinafter, the applications of the light-transmissible element on other fields will be described with reference to a seventh embodiment.

Figure 7A:
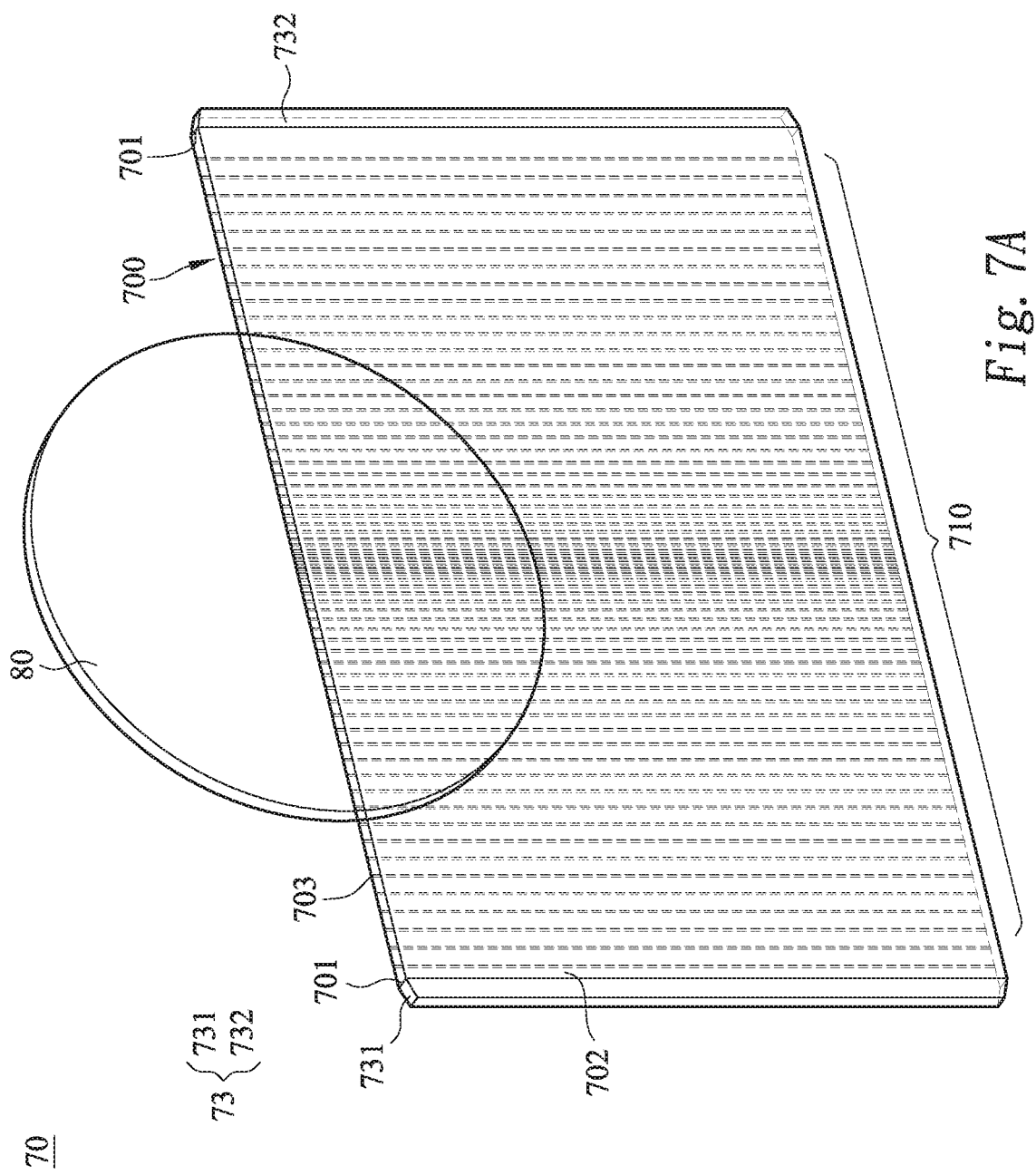
FIG. 7A is a schematic perspective view illustrating a portion of a lamp device according to a seventh embodiment of the present invention.

In the above embodiments, the light-transmissible element is installed in a lamp device. Alternatively, the light-transmissible element is installed in a lighting device, a door/window panel, an exhibition frame or an exhibition shop window. Hereinafter, a light-transmissible shop window panel 70 will be taken as an example. FIGS. 7A and 7B are schematic perspective views illustrating the applications and usage statuses of a light-transmissible element according to a seventh embodiment of the present invention. In FIGS. 7A and 7B, a light-transmissible shop window panel 70 is shown. The light-transmissible shop window panel 70 comprises a light-transmissible element 700 and at least one light-emitting element 73. The light-transmissible element 700 comprises two light-inputting surfaces 701, a first light-outputting surface 702, a second light-outputting surface 703 and plural microstructures 710. The at least one light-emitting element 73 comprises two light emitting diode strips 731 and 732 or two light emitting diode bands 731 and 732.

The two light-inputting surfaces 701 are located at a right edge and a right edge of the light-transmissible element 700, respectively. Alternatively, in another embodiment, the two light-inputting surfaces 701 are located at a top edge and a bottom edge of the light-transmissible element 700, respectively. Moreover, the second light-outputting surface 703 is closer to an article 80 than the first light-outputting surface 702. That is, the first light-outputting surface 702 of the light-transmissible shop window panel 70 is a smooth light-transmissible surface at the front side, and the second light-outputting surface 703 is located at the rear side and near the exhibited article 80. The plural microstructures 710 are formed on the second light-outputting surface 703 for receiving and refracting the light beams from the two light-inputting surfaces 701. The designs of the plural microstructures 710 are determined according to the installation positions of the light sources (i.e., the installation positions of the light-emitting elements 73, 731 and 732). The depth of the microstructure 701 of the light-transmissible element 700 is gradually increased in the direction from the bilateral sides to the centerline. In addition, the spacing interval between every two adjacent microstructures 710 is gradually decreased in the direction from the bilateral sides to the centerline.

The microstructures 710 (e.g., the spacing interval between every two adjacent microstructures, the cutting depth of the microstructure, the acute angle and the cutting surface width) may be designed according to the installation position of the light source. Optionally, the microstructures 710 may be designed according to the intensity of the light source (i.e., the power of the light-emitting element). That is, the applications of the microstructures are not restricted.

The two light emitting diode strips 731 and 732 or the two light emitting diode bands 731 and 732 of the at least one light-emitting element 73 are located or arranged at the two light-inputting surfaces 701, respectively. Moreover, according to the ambient brightness or a command signal from a control circuit board, the two light emitting diode strips 731 and 732 or the two light emitting diode bands 731 and 732 of the at least one light-emitting element 73 emit the light beams.

In practice, the light-transmissible shop window panel 70 is applied to an exhibition window of a department store or applied to a bus booth on a sidewalk. The application on the exhibition window will be described as follows. In case that the plural light beams are not emitted by the light-emitting element 73 and the plural light beams are not received by the light-transmissible shop window panel 70, the light-transmissible element 700 is in a visual penetration state. In case that the plural light beams are emitted by the light-emitting element 73 and the plural light beams are received and refracted by the plural microstructures 710, the light-transmissible element 700 is in an illumination state. When the light-transmissible element 700 is in the visual penetration state, a portion of the article 80 behind the second light-outputting surface 703 is visible through the first light-outputting surface 702 (see FIG. 7A).

When the light-transmissible element 700 is in the illumination state, a luminous flux of the light beams outputted from the first light-outputting surface is higher than a luminous flux of the light beams outputted from the second light-outputting surface. Consequently, the light-transmissible element 700 produces a bright surface like a light wall. Under this circumstance, the region of the article 80 sheltered by the light wall of the second light-outputting surface 703 is invisible.

In such way, the light-emitting element 73 of the light-transmissible shop window panel 70 may be driven to emit the plural light beams according to the usage scenario of the mall or the store. For example, when the pedestrians walk across or approach the exhibition window of the light-transmissible shop window panel 70, the light-emitting element 73 emits the light beams to attract the eyes of the pedestrians on the exhibition window. In case that the light-transmissible shop window panel 70 is applied to a bus booth, the light-emitting element 73 may be driven to emit the plural light beams according to the change of the ambient brightness. Consequently, the light-transmissible shop window panel 70 is selectively in the visual penetration state or the illumination state.

For example, in case that the surrounding environment is cloudy, rainy or dark, the light-emitting element 73 may be driven to emit the light beams according to the sensing result of a sensor (not shown). Consequently, the light-transmissible element 700 is in the illumination state and a light wall is generated to facilitate the pedestrians to walk or facilitate the buses to park. Consequently, the efficacy of the public environment safety is enhanced. In case that the surrounding environment is sunny or daytime, the light-emitting element 73 does not emit the light beams according to the sensing result of the sensor (not shown). Consequently, the light-transmissible element 700 is in the visual penetration stat for facilitating the pedestrians to see the surrounding environment through the light-transmissible element 700 and observe whether the bus arrives at the station. In other words, the multiple effects are provided. For example, the sensor is a photoelectric sensor, and a photosensitive element in the sensor is used to convert the optical signal into a telecommunication signal. Consequently, the light-emitting element is driven to emit the light beams according to the change of the ambient brightness. It is noted that the type of the sensor is not restricted.

Moreover, the light-transmissible element of the present invention is made of polycarbonate (PC plastics), acrylonitrile butadiene styrene (ABS resin), or the combination thereof. Consequently, the light-transmissible element may be formed as a one-piece structure through an injection molding process. Alternatively, the microstructures of the light-transmissible element (e.g., the V-shaped optical refractive structures in the above embodiments) are processed by a single cutting process and integrally formed and the complicated manufacturing procedures are not required. In other words, the process of fabricating the light-transmissible element is simple, the light-transmissible element with different arrangements of microstructures is selected according to the lighting requirements of the lamp device, and the problem of generating the light spot is solved. Consequently, the drawbacks of the conventional lamp device can be overcome.

From the above descriptions, the present invention provides a light-transmissible element and a lamp device with the light-transmissible element. In accordance with the features of the present invention, the appearance of the light-transmissible element and the profiles and the arrangements of the microstructures are specially designed. Consequently, the lighting effect and the usage state of the light-transmissible element can be adjusted according to the practical requirements. Due to this design, the light extraction efficiency of the overall lamp device is increased, the light output range is adjustable and the generation of the light spots is reduced. Moreover, the usage state of the light-transmissible element may be selectively in a visual penetration state or an illumination state according to the practical requirements. Consequently, the multiple effects are provided.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A light-transmissible element of a lamp device, the lamp device further including a lamp body and a light-emitting device, and the light-transmissible element being mounted onto the lamp body and comprising:
    a light-inputting surface receiving light from the light-emitting device;
    a first light-outputting surface disposed at a side the light-inputting surface and outputting light received through the light-inputting surface;
    a second light-outputting surface disposed at the side of the light-inputting surface and opposite to the first light-outputting surface, and outputting light received through the light-inputting surface; and
    a plural microstructures formed on the second light-outputting surface, wherein each microstructure at least comprises a first refractive surface and a second refractive surface,
    wherein the light received through the light-inputting surface is interfered by the plural microstructures in a vertical interference relationship or a non-parallel interference relationship, and a luminous flux of light refracted by each first refractive surface is higher than a luminous flux of light refracted by each second refractive surface, and
    wherein when receiving no light from the light-emitting device, the light-transmissible element is in a visual penetration state, and at least one article located at the second light-outputting surface is visible through the first light-outputting surface; and when receiving light from the light-emitting device, the light-transmissible element is in an illumination state, and the light received through the light-inputting surface is retracted by the plural microstructures in a manner that a luminous flux from the first light-outputting surface is higher than a luminous flux from the second light-outputting surface.

2. The light-transmissible element according to claim 1, wherein the plural microstructures are V-shaped optical refractive structures, U-shaped optical refractive structures, curvy optical refractive structures, or the combination thereof.

3. The light-transmissible element according to claim 1, wherein the second light-outputting surface, where the plural microstructures are disposed, is convex or concave, and a spacing interval between every two adjacent microstructures of the plural microstructures is gradually decreased from the light-inputting surface.

4. The light-transmissible element according to claim 1, wherein in each microstructure, an acute angle between the first refractive surface and the second light-outputting surface is smaller than an acute angle between the second refractive surface and the second light-outputting surface.

5. The light-transmissible element according to claim 1, wherein adjacent microstructures of the plural microstructures are in a continuous arrangement, a discontinuous arrangement or a partially-continuous arrangement.

6. The light-transmissible element according to claim 1, wherein the light-transmissible element is made of polycarbonate, acrylonitrile-butadiene-styrene, or a combination thereof.

7. The light-transmissible element according to claim 1, wherein the light-transmissible element is a circular light-transmissible element.

8. The light-transmissible element according to claim 1, wherein the light-transmissible element has a sealed, solid and thin light-transmissible structure, or the light-transmissible element has a hollow light-transmissible structure with a first light-transmissible plate and a second light-transmissible plate, wherein the first light-outputting surface is formed on the first light-transmissible plate, the second light-outputting surface is formed on the second light-transmissible plate, and the second light-outputting surface of the hollow light-transmissible structure comprises an inner side and an outer side, wherein the inner side of the second light-outputting surface is closer to the first light-outputting surface than the outer side of the second light-outputting surface, and the plural microstructures are formed on at least one of the outer side of the second light-outputting surface.

9. The light-transmissible element according to claim 8, wherein when the light-transmissible element has the hollow light-transmissible structure, the optical channel is a hollow gap between the inner side of the second light-outputting surface and the first light-outputting surface, and the plural light beams are transferred through the hollow gap.

10. A lamp device with a light-transmissible element, the lamp device at least comprising:
    a lamp body;
    at least one light-emitting element installed on the lamp body, wherein the at least one light-emitting element emits plural light beams under control of a control circuit board; and
    the light-transmissible element combined with the lamp body, and comprising:
        a light-inputting surface for receiving the plural light beams;
        a first light-outputting surface located beside a first side of the light-inputting surface;
        a second light-outputting surface located beside a second side of the light-inputting surface, and opposed to the first light-outputting surface; and
    plural microstructures formed on the second light-outputting surface,
    wherein a first microstructure of the plural microstructures is different from a second microstructure of the plural microstructures, wherein after the plural light beams are received and refracted by the plural microstructures, the light beams are outputted from the first light-outputting surface and the second light-outputting surface, wherein a luminous flux of the light beams outputted from the first light-outputting surface is higher than a luminous flux of the light beams outputted from the second light-outputting surface.

11. The lamp device according to claim 10, wherein the plural microstructures are V-shaped optical refractive structures, U-shaped optical refractive structures, curvy optical refractive structures, or the combination thereof.

12. The lamp device according to claim 10, wherein a spacing interval between every two adjacent microstructures of the plural microstructures is gradually decreased or increased along a direction away from the at least one light-emitting element, or a depth of each microstructure relative to the second light-outputting surface is gradually decreased or increased along a direction away from the at least one light-emitting element.

13. The lamp device according to claim 10, wherein each microstructure comprises a first refractive surface and a second refractive surface, wherein an acute angle between the first refractive surface and the second light-outputting surface is smaller than an acute angle between the second refractive surface and the second light-outputting surface.

14. The lamp device according to claim 10, wherein adjacent microstructures of the plural microstructures are in a continuous arrangement, a discontinuous arrangement or a partially-continuous arrangement.

15. The lamp device according to claim 10, wherein the lamp body comprises a coupling mechanism with a guiding slot, wherein the light-transmissible element is assembled and connected with the at least one light-emitting element through the guiding slot, wherein the coupling mechanism further comprises plural fins, and the plural fins and the second light-outputting surface are located at the same side.

16. The lamp device according to claim 10, wherein the lamp device further comprises at least one of a passive infrared motion sensor and a microwave sensor, which is electrically connected with the control circuit board, wherein if an object is sensed by the passive infrared motion sensor or the microwave sensor, the control circuit board is driven to control the at least one light-emitting element to emit the plural light beams.

* * * * *